US009291710B2

(12) United States Patent
Debroux et al.

(10) Patent No.: US 9,291,710 B2
(45) Date of Patent: Mar. 22, 2016

(54) METHOD AND APPARATUS FOR DETECTING SUBSURFACE TARGETS USING DATA INVERSION AND A TEMPORAL TRANSMISSION LINE MODEL

(71) Applicants: Patrick S. Debroux, Las Cruces, NM (US); Benjamin C. Flores, El Paso, TX (US)

(72) Inventors: Patrick S. Debroux, Las Cruces, NM (US); Benjamin C. Flores, El Paso, TX (US)

(73) Assignees: Board of Regents, The University of Texas System, Austin, TX (US); The United States of America as represented by the Secretary of the Army, Washington, DC (US)

( * ) Notice: Subject to any disclaimer, the term of this patent is extended or adjusted under 35 U.S.C. 154(b) by 234 days.

(21) Appl. No.: 14/066,301

(22) Filed: Oct. 29, 2013

(65) Prior Publication Data

US 2014/0240162 A1  Aug. 28, 2014

Related U.S. Application Data

(60) Provisional application No. 61/720,813, filed on Oct. 31, 2012.

(51) Int. Cl.
| | | |
|---|---|---|
| *G01S 13/88* | (2006.01) | |
| *G01V 3/12* | (2006.01) | |
| *G01V 8/00* | (2006.01) | |

(52) U.S. Cl.
CPC ............. *G01S 13/885* (2013.01); *G01S 13/887* (2013.01); *G01V 3/12* (2013.01); *G01V 8/005* (2013.01)

(58) Field of Classification Search
CPC .................. G01S 13/885–13/888; G01V 3/12; G01V 8/005
USPC ........................................................... 342/22
See application file for complete search history.

(56) References Cited

U.S. PATENT DOCUMENTS

| 5,420,589 A * | 5/1995 | Wells et al. ............... 342/22 |
| 2002/0175849 A1 * | 11/2002 | Arndt et al. ............... 342/22 |
| 2005/0078028 A1 * | 4/2005 | Cist ............................ 342/22 |
| 2006/0087471 A1 * | 4/2006 | Hintz .......................... 342/22 |
| 2006/0152404 A1 * | 7/2006 | Fullerton et al. ........... 342/28 |
| 2010/0060509 A1 * | 3/2010 | Chambers et al. ......... 342/22 |
| 2010/0237871 A1 * | 9/2010 | Allouche et al. ......... 324/337 |

(Continued)

OTHER PUBLICATIONS

Balanis, C.A., "Antenna Theory, Analysis and Design," Harper and Row, 1982, p. 103, p. 118.

(Continued)

*Primary Examiner* — Peter Bythrow
(74) *Attorney, Agent, or Firm* — Kermit D. Lopez; Luis M. Ortiz; Ortiz & Lopez, PLLC

(57) ABSTRACT

A method and apparatus for detects one or more subsurface targets by receiving a reflectivity data from two or more subsurface reflectors using a ground penetrating radar. The two or more subsurface reflectors may include the one or more subsurface targets and a medium surrounding the one or more subsurface targets. An impedance data for the two or more subsurface reflectors is calculated by inverting the reflectivity data using a temporal transmission line model with a "layer-peeling" method. One or more constitutive parameters of the two or more subsurface reflectors are calculated based on the impedance data. The one or more subsurface targets are detected based on a change in the one or more constitutive parameters.

13 Claims, 11 Drawing Sheets

(56) References Cited

U.S. PATENT DOCUMENTS

| | | | |
|---|---|---|---|
| 2013/0135136 A1* | 5/2013 | Haynes et al. | 342/22 |
| 2013/0154846 A1* | 6/2013 | Mangione et al. | 340/854.6 |
| 2014/0125508 A1* | 5/2014 | Stolarczyk et al. | 342/22 |
| 2014/0125509 A1* | 5/2014 | Stolarczyk et al. | 342/22 |

OTHER PUBLICATIONS

Balanis, C.A., "Advanced Engineering Electromagnetics," John Wiley and Sons, 1989, p. 150.

Bruckstein, A.M., T. Kalaith, "Inverse Scattering for Discrete Inversion-Line Models," SIAM Review, V29, #3, Sep. 1987, pp. 359-389.

Burkhart, S.C., R.B. Wilcox, "Arbitrary Pulse Shape Synthesis via Nonuniform Transmission Lines," IEEE Trans. MTT, Oct. 1990, V38, #10, pp. 1514-1518.

Daniels, David, "Ground Penetrating Radar (2nd Edition)," IEE Radar, Sonar, and Navigation Series, 2004, p. 21.

Frolik, J.L., A.E. Yagle, "Forward and Inverse Scattering for Discrete Layered Lossy and Absorbing Media," IEEE Trans. Circuits and Systems-II: Analog and Digital Signal Processing, Sep. 1997, V 44, #9, pp. 710-722.

Niitek, http://www.niitek.com/features.php.

\* cited by examiner

METHOD AND APPARATUS FOR DETECTING SUBSURFACE TARGETS USING DATA INVERSION AND A TEMPORAL TRANSMISSION LINE MODEL

CROSS-REFERENCE TO RELATED APPLICATIONS

This application claims priority to U.S. provisional patent application Ser. No. 61/720,813 filed on Oct. 31, 2012 and entitled "Method and Apparatus for Detecting Subsurface Targets Using Data Inversion and a Temporal Transmission Line Model," the entire contents of which is incorporated herein by reference.

STATEMENT OF FEDERALLY FUNDED RESEARCH

This invention was made with government support under Grant No. W911QX08-D-0001-0004 awarded by the United States Army Research Laboratory. The government has certain rights in the invention.

FIELD OF THE INVENTION

The present invention relates generally to the field of ground penetrating radar and, more particularly, to a method and apparatus for detecting subsurface targets using data inversion and a temporal transmission line model.

BACKGROUND OF THE INVENTION

Due to the recent dangers that improvised explosive devices (IEDs) have created, much research has been performed on the detection and identification of these targets. Because of the dangers inherent in the proximity of these IEDs, the recent research trend has been to search for these targets from rapidly moving vehicles. While ground penetrating radar (GPR) and data capturing systems are getting fast enough to probe the subsurface from vehicles moving at substantial velocities, accurate automated detection and identification of targets, such as IEDs, remains a complex problem.

Because of the quantity of data involved, and the complexity of GPR data interpretation, automatic target recognition (ATR) modules are used on presently fielded systems [1][2]. These ATR modules must function in near real-time, with a low probability of false alarm. The target recognition software in present use compares the shapes and depths of objects sensed by the GPR to a database of shapes to recognize targets-of-interest. Although conventional GPR can detect lossy dielectrics, it cannot discriminate between targets of different permittivity, leading to high false alarm rates.

SUMMARY OF THE INVENTION

Because of the subtle responses of non-metallic targets, a new approach to target detection and identification is attempted by inverting the GPR data for the constitutive parameters of the targets. In this way, and perhaps in conjunction with traditional shape-based automatic interpretation, better target detection and fewer false alarms can be obtained from ATR modules.

The present invention has both military and commercial uses. For example, the present invention can be used for detection and discrimination of dielectric targets, such as non-metallic IED components and non-metallic land mines. A complementary method to use is automatic target recognition (ATR) techniques. Civil engineering applications can include detect and identify liquids in buried plastic/PVC/ASS pipes by their constitutive parameters, use permittivity/conductivity values to reduce false alarm rate, moisture content of subsurface, water table salinity, identification of buried material, non-intrusive identification and salinity determination of the water table, rate determination of underground fluid flow by salinity measurements, etc. Environmental engineering applications can include aqueous versus non-aqueous targets, substance identification of subsurface spills (polar vs. non-polar and non-polar spills vs. water table), non-invasive substance identification, etc. Other applications are also possible, such as non-destructive testing and identification of materials (solids/fluids/gasses), such as lossy dielectrics.

An impulsive transmission line inversion algorithm based on the layer-peeling method has been developed to trace-wise invert the impedance values of shallow dielectric objects that are sensed with ground penetrating radar (GPR). The transformation of the GPR data to impulsive transmission line data was necessary to use the inversion algorithm. This transformation includes geometric-loss correction, and converting the GPR trace to an impulsive reflection record of the subsurface. Controlled data was collected using plastic bottles filled with various liquids buried at known depths in a sandbox. The relative permittivity of the sand was calculated using a velocity analysis, and this permittivity was used to recreate the transmission pulse amplitude needed for the inversion. The trace-wise inversion was repeated on subsequent traces to yield the inversion of complete GPR cross-sections.

In one embodiment, the present invention provides a ground penetrating radar that includes a transmitter, a receiver, an antenna communicably coupled to the transmitter and the receiver, and a signal processor communicably coupled to the transmitter and the receiver. The signal processor receives a reflectivity data from two or more subsurface reflectors, calculates an impedance data for the two or more subsurface reflectors by inverting the reflectivity data using a temporal transmission line model with a "layer-peeling" method, calculates one or more constitutive parameters of the two or more subsurface reflectors based on the impedance data, and detects the one or more subsurface targets based on a change in the one or more constitutive parameters. The two or more subsurface reflectors may include the one or more subsurface targets and a medium surrounding the one or more subsurface targets.

In another embodiment, the present invention provides a method for detecting one or more subsurface targets. A reflectivity data is received from two or more subsurface reflectors using a ground penetrating radar. The two or more subsurface reflectors may include the one or more subsurface targets and a medium surrounding the one or more subsurface targets. An impedance data for the two or more subsurface reflectors is calculated by inverting the reflectivity data using a temporal transmission line model with a "layer-peeling" method. One or more constitutive parameters of the two or more subsurface reflectors are calculated based on the impedance data. The one or more subsurface targets are detected based on a change in the one or more constitutive parameters. The method can be implemented as a computer program embodied on a non-transitory computer readable medium wherein each step is performed by one or more code segments. Moreover, the method can be implemented as a module added to an existing ground penetrating radar.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Traditional ground penetrating radar (GPR) yields reflectivity of subsurface reflectors. Target reflectivity is due to mismatches in the electromagnetic properties of the target relative to the surrounding medium. The present invention post-processes the GPR return traces to obtain information of the subsurface that goes beyond radar reflectivity. More specifically, the inversion process solves for the impedance of the reflector, from which the constitutive parameters of the reflectors can be calculated. This method thus yields more target information that can yield to better discrimination. The post-processing of the GPR data is possible with the advent of fully digital GPR receivers. Inversion of the radar data is especially relevant in the detection and discrimination of non-metallic targets such as improvised explosive devices (IED) trigger mechanisms and plastic land mines. A trace-wise inversion approach is taken to allow this post-processing to run in near real-time.

The GPR cross-section is made up of individual traces that are displayed in a waterfall plot. The present invention inverts these individual traces for the impedance of the reflectors using transmission-line theory. The virtue of single trace inversion that are inherently one-dimensional is that they can be performed in near real time, allowing for a near real-time display upgrade as the GPR survey is taken. Moreover, the modular nature of the inversion, and the fact that it calculates impedance one trace at a time will allow present GPR manufacturers to load this module on their existing receivers with little interference.

Figure 1:
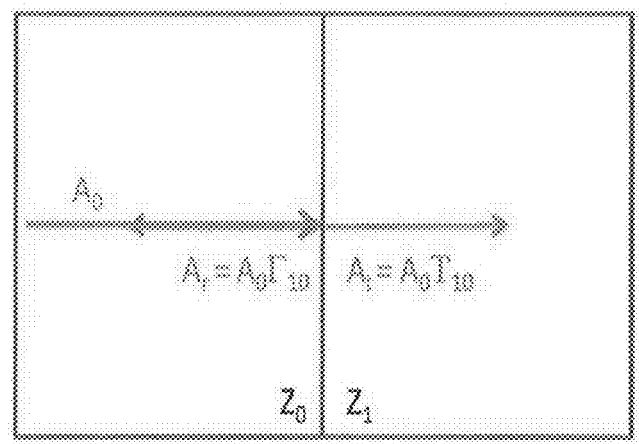
FIG. 1 is a schematic defining the transmission and reflection coefficients $\Gamma_{10}$ and $T_{10}$ in accordance with one embodiment of the present invention.

A transmission line inversion algorithm was chosen to perform the one dimensional inversion, as first described by [3]. The inverse scattering of this transmission line is determined using the "layer-peeling" method. The layer-peeling algorithm makes use of the reflection and transmission coefficients that describe the propagation of a wave through a piecewise continuous transmission line. If an electric wave impinges on a transmission line section with different electrical properties, some of the wave will be reflected back while the rest of the wave will propagate into the section. The coefficients that describe the amplitudes of the reflection and transmission are usually referred to as $\Gamma$ and $T$ and are described in FIG. 1.

The reflection coefficient $\Gamma_{10}$ is defined in terms of the section impedances as $$\Gamma_{10} = \frac{A_r^{10}}{A_0} = \frac{Z_1 - Z_0}{Z_1 - Z_0}, \quad (1)$$

while the transmission coefficient is defined as $$T_{10} = \frac{A_t^{10}}{A_0} = 1 + \Gamma_{10}, \quad (2)$$

where $A_r^{10}$ and $A_t^{10}$ are the amplitude of the reflected and transmitted waves at the $Z_0/Z_1$ interface.

Consider a continuous waveform propagating through a segmented transmission line. If the amplitudes of the exciting ($A_0$) and reflected ($A_r^{10}$) waveforms are measured, the impedance of the first segment can be calculated from Equation (1) as $$Z_1 = \left(\frac{1 + \Gamma_{10}}{1 - \Gamma_{10}}\right) Z_0 \quad (3)$$

and the continuous waveform can be propagated to the next interface using $$A_t^{21} = A_0 T_{10}, \quad (4)$$

where the superscripts indicate the interface locations of the wave amplitudes. This procedure can be repeated until the impedance profile of the transmission line is known.

Figure 2:
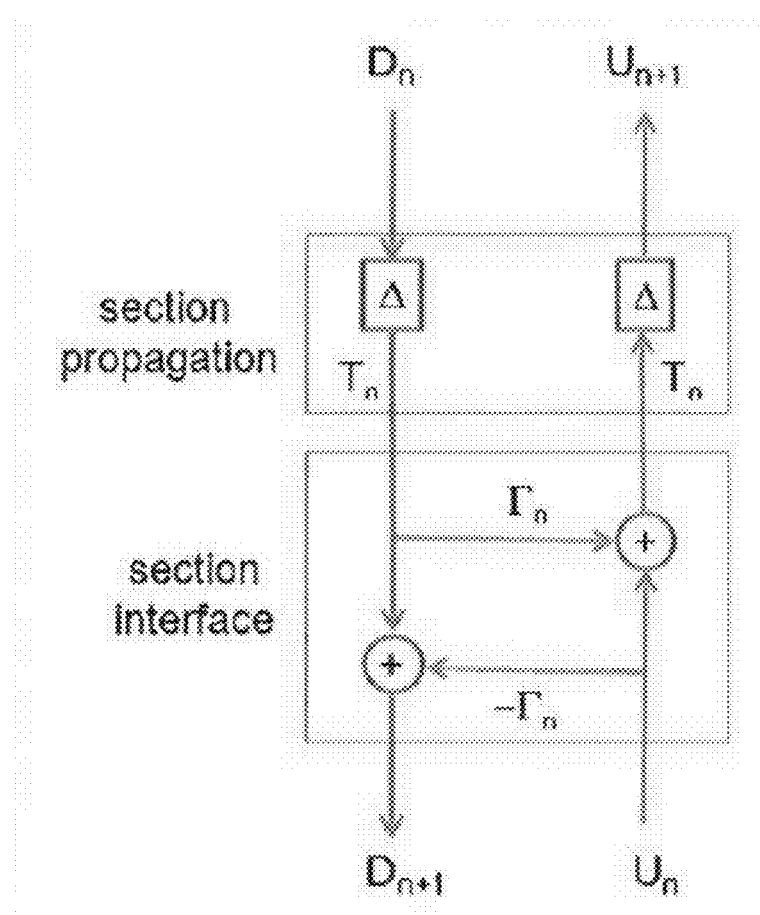
FIG. 2 is a diagram of a causal transmission line model propagating a signal from segment n to segment n+1 in accordance with one embodiment of the present invention.

If a temporal waveform, such as a pulse, is propagated through a transmission line, propagation delays must be included in the model. Following [3], the propagation model of an impulse through a piecewise continuous transmission line can be described by the block diagram in FIG. 2. In it, Bruckstein and Kalaith define a downward propagating wave D and an upward, reflected wave U. The upper box in FIG. 2 represents the propagation of the wave through the $n^{th}$ segment. As part of this propagation, the waves are delayed in time by a propagation delay unit $\Delta_1$ and modified by the transmission coefficient T. The lower box in FIG. 2 represents the reflection mechanism of the wave at a layer interface. As is seen, part of the downward wave $D_n$ is reflected at the interface and is thus transferred into the upward wave $U_n$. The amount of $D_n$ that is transferred to $U_n$ is controlled by the reflection coefficient $\Gamma_n$. The same process acts on $U_n$ which reflects some of its energy to $D_{n+1}$ with a $-\Gamma_n$ proportionality.

FIG. 2 can be redrawn to have the propagation (and thus the iteration direction) in the same direction [3]. This equivalent model, which is non-causal since the time delay operator $\Delta$ in $U_n$ is replaced by a time advance operator $\nabla$, is presented in FIG. 3. This modification allows the model to algorithmically propagate in the same direction, with the same starting point to apply the initial conditions.

Figure 3:
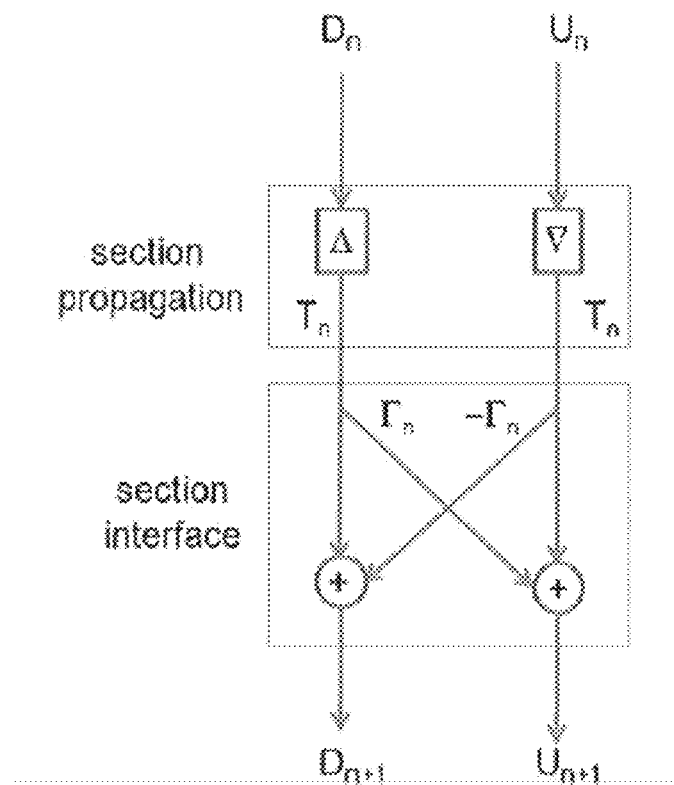
FIG. 3 is a diagram of the equivalent non-causal transmission line propagation model shown in FIG. 2.

The equations that describe the non-causal model shown in FIG. 3 are $$T_n D_{n+1} = \Delta D_n - \nabla \Gamma_n U_n \quad (5)$$

$$T_n U_{n+1} = \Delta \Gamma_n D_n + \Delta U_n, \quad (6)$$

which can be succinctly written as $$\begin{bmatrix} D_{n+1} \\ U_{n+1} \end{bmatrix} = \frac{1}{T_n} \begin{bmatrix} 1 & -\Gamma_n \\ \Gamma_n & 1 \end{bmatrix} \begin{bmatrix} \Delta & 0 \\ 0 & \nabla \end{bmatrix} \begin{bmatrix} D_n \\ U_n \end{bmatrix}. \quad (7)$$

This temporal propagation model can be used to calculate the forward scattering of a piecewise continuous transmission line and to invert forward scattering data to obtain the constitutive parameters of transmission line sections [4]. For the forward scatter calculation, Frolik and Yagle use a z-transform operator to advance and delay the $D_n$ and $U_n$ waveforms. In the inversion algorithm, the time advances and delays are implemented in the sampled waveforms as vector index shifts.

Since the GPR received traces are sampled and digitized, the propagation model is iterated on every sample, thereby treating each sample-time propagation distance as a virtual layer. These virtual layers will not necessarily coincide with the actual layering of the media, and this will cause the propagation model to calculate many of the layer reflection coefficients $\Gamma_n$ to be zero (and transmission coefficients $T_n$ to be one). By implementing the propagation algorithm in this manner, no error is introduced by its granularity since the GPR used is digital and therefore samples its received signal.

The forward scatter problem comprises of determining the impulse response of a piecewise continuous transmission line knowing only the impedances of each section. Since no reflected wave U exists a-priori, vector index shifts are not possible to advance or delay the signals. Frolik and Yagle use a z-transform operator to advance and delay the signals in their algorithms. Because of the difficulty of a numerically concise inverse z-transform in MATLAB, the Fourier transform is used instead to advance or delay the D and U waveforms. MATLAB has optimized the fast Fourier transform (FFT) function, making Fourier transform and inverse Fourier transforms very efficient. The Fourier delay operator is simply $$\Delta(\omega) = e^{-\omega \cdot dt} \quad (8)$$

and the advance operator $$\nabla(\omega) = e^{\omega \cdot dt} \quad (9)$$

in the spectral domain. Adapting the Frolik and Yagle derivation, Equation (7) is rewritten as $$\begin{bmatrix} D_{n+1}(\omega) \\ U_{n+1}(\omega) \end{bmatrix} = \frac{1}{T_n} \begin{bmatrix} 1 & -\Gamma_n \\ \Gamma_n & 1 \end{bmatrix} \begin{bmatrix} e^{-i\omega \cdot dt} & 0 \\ 0 & e^{i\omega \cdot dt} \end{bmatrix} \begin{bmatrix} D_n(\omega) \\ U_n(\omega) \end{bmatrix} = F_n(\omega) \begin{bmatrix} D_n(\omega) \\ U_n(\omega) \end{bmatrix} \quad (10)$$

where dt is the sample time interval, and where now the calculation is performed in the frequency domain. Because this is a forward scattering algorithm, the impedances $Z_n$ of each layer is known and the reflection coefficient $\Gamma_n$ for each interface is calculable using Equation (1).

As in [4], the propagation matrix is cascaded from the bottom transmission line section, n=N, to the surface section, n=1, to calculate the reflected impulse response of the whole transmission line, $$\begin{bmatrix} D_1(\omega) \\ U_1(\omega) \end{bmatrix} = \prod_{n=0}^{N-1} F_{N-n}(\omega) \begin{bmatrix} D_N(\omega) \\ U_N(\omega) \end{bmatrix} = M(\omega) \begin{bmatrix} D_N(\omega) \\ U_N(\omega) \end{bmatrix} \quad (11)$$

where the transition matrix for the whole medium, M, is a 2 by 2 matrix of polynomials $$M(\omega) = \begin{bmatrix} F_{11}(\omega) & F_{12}(\omega) \\ F_{21}(\omega) & F_{22}(\omega) \end{bmatrix}. \quad (12)$$

The complete solution of the reflected impulse response is given by [4] as $$R(\omega) = \frac{-F_{21}(\omega)}{F_{22}(\omega)}. \quad (13)$$

All that is left to do is to transform the reflected impulse response of the piecewise continuous transmission line to the temporal domain via an inverse FFT.

The resulting synthesized forward scatter waveform is the complete solution because it not only incorporates the primary reflections of an impulse propagating through a piecewise continuous transmission line, but incorporates all reflections including the secondary and tertiary reflections that arise from multiple bounces within the sections.

With the concept of the layer-peeling method and the propagation model, an inversion algorithm that yields the constitutive parameters of the piecewise continuous transmission line energized by an impulse was devised [3]. Given the impulse transmit signal D and the sampled received signal U at one end of the transmission line, the propagation model propagates D, the travel distance of one sample time interval, and recreates U at that distance. The ratio of $U_{n+1}$ over $D_{n+1}$ defines $\Gamma_{n+1}$ at the $(n+1)^{th}$ interface which, in turn, allows the calculation of the transmission coefficient $T_{n+1}$ and the impedance $Z_{n+2}$.

Because the algorithm delays $D_n$ one time unit and advances $U_n$ one time unit in each iteration, there is the chance that an interface may be missed by the inversion algorithm since the reflection coefficient $\Gamma_n$ is calculated as the ratio of $U_n$ to $D_n$. To mitigate this eventuality, the transmission line is discretized into segments having electrical length proportional to dt, the sample time of the measurement system, while the excitation (transmit) and response (receive) waveforms are discretized in sample times proportional to a travel time of 2dt [3][5]. A practical way of doing this is to repeat each data point in the excitation (D) and response (U) vectors, thereby doubling the length of the vectors.

Now that the inversion algorithm for an impulse response propagating in a transmission line has been derived, adjustments must be made to the algorithm so that it can invert the electromagnetic propagation and reflections of impulse signals through a layered medium. These adjustments take the form of setting a characteristic impedance of the medium, correcting for the geometric spreading of the electromagnetic waves as they propagate, and including the ohmic attenuation the electromagnetic wave experiences as it propagates in the lossy subsurface.

Two of the three adjustments necessary depend on the radiation region in which the target is found. Three radiation regions are normally defined: The inductive near-field, the radiating near-field (the Fresnel region), and the radiating far-field (Fraunhofer region). At GPR operating frequencies, military targets-of-interest such as IED components and land mines lie in the Fresnel region and in the beginning of the Fraunhofer region.

The characteristic impedance of free-space, $\eta$, is defined as $$\eta = \sqrt{\frac{\mu_0}{\varepsilon_0}} = 120\pi, \quad (14)$$

where $\mu_0 = 4\pi \cdot 10^{-7}$ is the magnetic permeability of free space, and $$\varepsilon_0 = \frac{1}{\mu_0 c^2} = 8.854 \cdot 10^{-12}$$

is the permittivity of free space, with c=speed of light=299792458 m/s.

This formulation implies the magnetic field H and the electric field E are orthogonal from each other as they are found in the Fraunhofer region. Because the antenna rests on or near the ground, $\eta$ cannot strictly be used to define the characteristic impedance of the layered medium "transmission line". This characteristic impedance definition is mostly convention, however, except in the definition of the effective impedance of a material from its permittivity: The impedance of a lossless dielectric is defined as [8]

$$Z = \sqrt{\frac{\mu}{\varepsilon}} = \sqrt{\frac{\mu_0}{\varepsilon_0 \varepsilon_r}} = \frac{\eta}{\sqrt{\varepsilon_r}} = \frac{120\pi}{\sqrt{\varepsilon_r}}, \quad (15)$$

which, because of its formulation, is implicitly valid only in the Fraunhofer region.

If this definition is inserted into Equation (1)

$$\Gamma_{10} = \frac{\frac{\eta}{\sqrt{\varepsilon_1}} - \frac{\eta}{\sqrt{\varepsilon_0}}}{\frac{\eta}{\sqrt{\varepsilon_1}} + \frac{\eta}{\sqrt{\varepsilon_0}}} = \frac{\sqrt{\varepsilon_0} - \sqrt{\varepsilon_1}}{\sqrt{\varepsilon_1} + \sqrt{\varepsilon_1}} \quad (16)$$

it is seen that $\eta$ cancels out making the definition of the reflection coefficient $\Gamma$ independent of radiation region. Because the layer-peeling method used in the inversion algorithm is based mostly on the transmission and reflection coefficient, T, $\Gamma$, the use of $\eta$ as the characteristic impedance of free-space is mostly one of convention.

The second necessary adjustment to the transmission line inversion algorithm that is also region dependent is the geometric spreading factor. Because the targets may be found in the Fresnel region, the complete fields for an infinitesimal electric dipole are considered. From [6], $$E_{\theta|\theta=\frac{\pi}{2}} = i\eta \frac{kI_0 l}{4\pi r}\left[1 + \frac{1}{ikr} - \frac{1}{(kr)^2}\right]e^{-ikr}, \quad (17)$$

where $$k = \frac{\sqrt{\varepsilon_r}\,\omega}{c}$$

is the medium wave number, $I_0$ is the dipole current, l is the length of the dipole, and r is the distance from the dipole.

Because the GPR receives reflection from targets, the travel path is twice the distance to the target (2-way travel) Akin to the radar range equation that relates transmit to receive power as a function of the fourth power of range, the distance dependence is the square of the fields reflected from the target. The geometric correction term $GC_n$ for the $n^{th}$ target is thus $$GC_n = \left|\left[\frac{1}{r_n} + \frac{1}{ikr_n^2} - \frac{1}{k^2r_n^3}\right]^2\right| \quad (18)$$

The importance of the received signal amplitude on the transmission line inversion requires the geometric spreading-loss correction factor to be very precise. This requirement makes it important to know the distance r precisely, including not only the subsurface depth of the target, but also the distance of the ground surface to the phase center of the antenna. This phase center is found on the surface of the printed bowtie dipole antenna found in the GPR transponder used for this study. The effective distance between the bottom of the antenna housing (that rests on the ground surface) and the antenna surface is a system variable that is invariant with surveys taken and with ground conditions. Because of the sensitivity of geometric loss correction, $GC_n$, to this variable, and the difficulty in calculating this variable analytically, its exact value will be determined empirically with controlled targets.

The third adjustment necessary, that of accounting for the ohmic attenuation of the wave propagating in the subsurface, is considered next. Since soil can be broadly categorized as a lossy dielectric and can have large parameter variations depending on its moisture content, the general attenuation constant as given by [8], $$\alpha = \omega\sqrt{\mu\varepsilon}\left\{\frac{1}{2}\left[\sqrt{1+\left(\frac{\sigma}{\omega\varepsilon}\right)^2}-1\right]\right\}^{\frac{1}{2}} \quad (19)$$

$$= \frac{\omega\sqrt{\varepsilon_r}}{c}\left\{\frac{1}{2}\left[\sqrt{1+\left(\frac{\sigma}{\omega\varepsilon_0\varepsilon_r}\right)^2}-1\right]\right\}^{\frac{1}{2}}$$

is used, and the attenuation coefficient, again taking the two-way path into account, is $$L_n = e^{-2\alpha r} \quad (20)$$

This attenuation coefficient is applied to every virtual layer associated with each propagation step.

With the application of these three adjustments, the GPR propagation and reflection data has been transformed into lossless transmission line data. Another transformation will be necessary, as will be found when analyzing the radar data.

A commercial single channel GPR was used to gather data to calibrate and test the inversion algorithm by obtaining the response of targets consisting of thin plastic bottles filled with fluids of known permittivity. The data resulting from these surveys were inverted to return the depth and constitutive parameters of these targets in the form of target impedance. The GPR unit used was the SIR System-20 manufactured by Geophysical Survey Systems, Inc. (GSSI). The antenna transponder used was the GSSI model 5100b having a center frequency of 1.6 GHz. 512 data points were used per trace, and no gains with depth were applied. The GSSI GPR was used as a single channel receiver, so that only the amplitude of the received signal was available for analysis.

The amplitude of the GPR transmit pulse, of paramount importance in the inversion algorithm, is not known and cannot be directly measured with this GPR. The effective transmit amplitude will be empirically calculated from field data of controlled targets. The controlled test targets were different laboratory quality liquids of known dielectric constant contained in thin plastic laboratory bottles. Table 1 shows the liquids used and their relative permittivity.

TABLE 1

Liquids used as targets and their relative permittivity

| Liquid | Relative Permittivity ($\varepsilon_r$) |
|---|---|
| Ethanol | 24.3 |
| Methanol | 33.1 |
| Ethylene Glycol | 37 |
| Saline $H_2O$ | <81 |
| Distilled $H_2O$ | 81 |

A sandbox was constructed in the UTEP radar laboratory and filled with dry sifted sand. The sandbox measured 1.43 m long, 0.56 m wide, and 0.38 m deep. The sand surface was approximately 0.05 m from the top of the sandbox. It was constructed just wide enough to contain the GPR antenna housing unit. The liquids were buried at different depths in the sand and the GPR antenna was passed over the targets on the surface of the sand.

Figure 4:
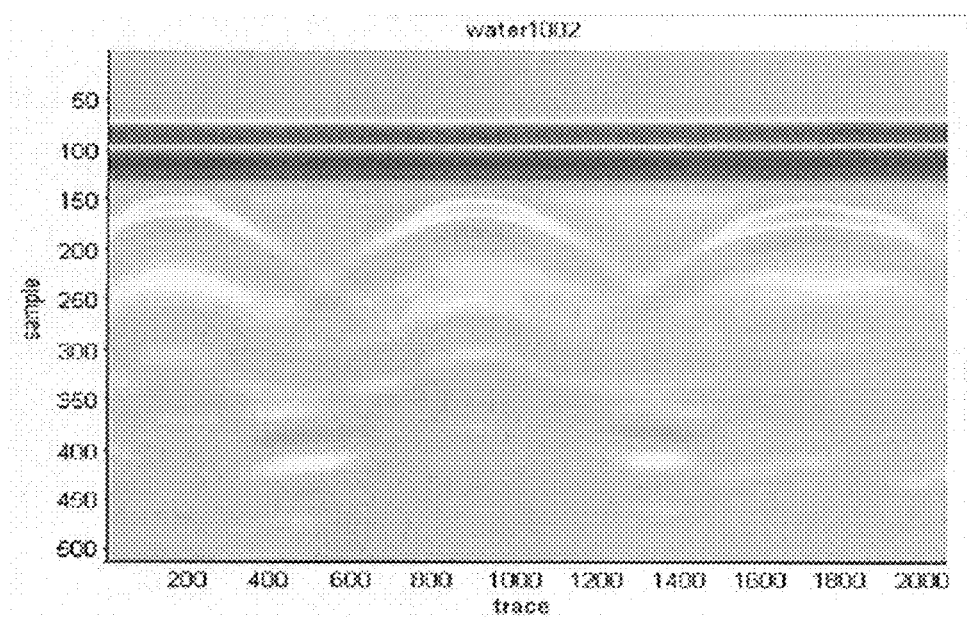
FIG. 4 shows GPR data of three different diameter distilled water filled bottles buried 10 cm in sand in accordance with the present invention.

The first targets sensed with the GPR were three distilled water filled bottles. These targets, with different circumferences, were buried 10 cm into the sand and their GPR response are shown in FIG. 4. The bottle diameters ranged from about 4 cm (left-most target) to about 8 cm (right-most target). Even though the 2-dimensional responses of the targets differ in the width of the resulting target hyperbolas, the amplitude of response are approximately equal as is seen by the color of the hyperbola apexes. Because the response of the different sized bottles were equal in amplitude, the smaller lab bottles were chosen to be used in the sandbox measurements to reduce the amount of fluids used.

FIG. 4 can be used to describe the effects of the finite dimensions of the sandbox on the GPR data. Note that the smaller diameter bottle gives the left-most response, the largest diameter bottle gives the right-most response. Because of the orientation of the GPR bowtie antennas (parallel the width dimension of the sandbox), not much effect is expected from the finite width of the sandbox (the dimension normal to the figure). The bottom of the sandbox is seen at about sample 310, and thus the events below sample 310 are due to the air-gap between the sandbox and the concrete floor, the concrete floor, and the reverberation created therein. Noteworthy is the strong surface response of the sand half-space. The CSSI GPR introduces a 100 sample delay to the top of the trace, thereby placing the surface reflection approximately at sample 100.

Figure 5:
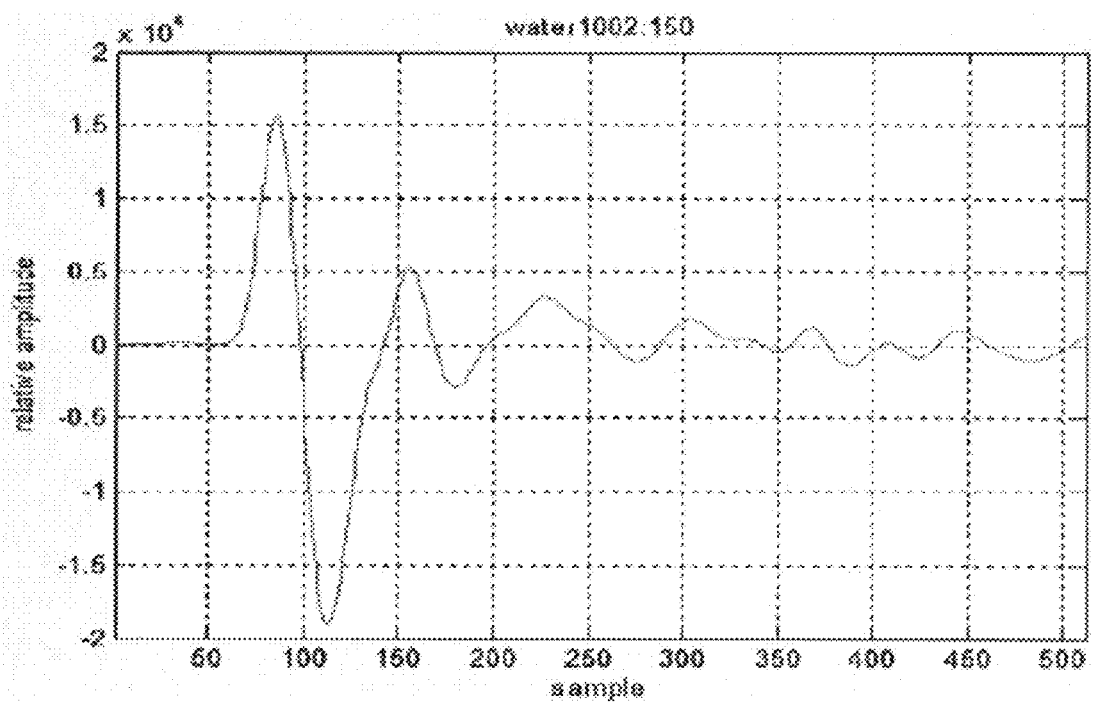
FIG. 5 is a graph of a GPR trace 150 of the section shown in FIG. 4 in accordance with the present invention.

Because of high soil attenuation, target resolution requirements, and other system considerations, GPR target ranges are limited to small distances. These short ranges call for very short pulses that dampen quickly. The transmit and received antennas, even though offset, are in close proximity to the soil and are designed to work with a soil of genetic conductivity and permittivity. Changes in the constitutive parameters of the soil near the antennas will cause an impedance mismatch within the antenna circuitry and change the nature of the signals transmitted and received. With these extreme system conditions imposed on the GPR antenna transponder, the transmit pulse shape is less than ideal. FIG. 5 shows trace 150 of the section shown in FIG. 4. It has had its header and DC bias removed. Note that this is the GPR return of a lab bottle filled with distilled water target buried 10 cm in sand.

When comparing FIGS. 4 and 5, the data between samples 50 and 150 can be interpreted as the reflection from the sand surface, and the data between samples 150 and 175 as being the return due to the distilled water ($\in_r=81$) target. The trace shown in FIG. 5 is far from impulsive!

Because the inversion algorithm successfully inverts the impulse response of a segmented transmission line, the GPR receive trace must be transformed into an impulsive record of reflection. Amplitude and time delay, which are indicative of reflection coefficient and depth of burial, must be preserved in this transformation.

Spectral deconvolution methods were attempted on the GPR traces, but perhaps because of the dispersive medium, proved mostly unsuccessful in making the received signal impulsive. Moreover, spectral deconvolution often introduces a sinusoidal component in the record that may cover the weaker returns in the received signal.

Another method to make the return signal impulsive was devised. The use of a peak detecting algorithm to approximate the impulsive delays and amplitudes of the GPR reflections was used. This approximate method was chosen over a more rigorous one to help keep the algorithm fast for near real-time execution.

First, the received waveform is rectified by taking the magnitude of the waveform. This prepares it to have its envelope calculated. The envelope of the resulting waveform is obtained by passing the waveform through a low-pass filter. The gentle low pass filter used is in the form of a second order Butterworth filter with a cutoff frequency equal to the center frequency of the antenna (1.6 GHz). A low order filter is used so as not to create more sidelobes and ripples in the received signal that may be falsely interpreted as targets.

Finally, a peak detection function intrinsic to the MATLAB environment was used to find the peaks in the received waveform. These peaks and their locations are vectorized to create the impulsive response of the subsurface targets to the GPR waveform. The MATLAB peak detection function has an associated threshold variable that controls the minimum peak height detected.

Because of the distortion of the return signal due to multiple reflection inherent in the GPR trace, and the difficulty in assigning geometric loss correction to secondary and tertiary reflections, only the first two peaks are kept, assuming that these represent the surface reflection and the reflection of the target-of-interest. Thus only the primary reflection from the targets are used even though the layer-peeling inversion algorithm is capable of using all reflections.

The threshold variable of the peak detector is dependent on the relative contrast of the target and the surface reflection, and on the relative distance between reflectors. The threshold value is set manually, and represents the first heuristic variable encountered in the inversion process.

Figure 6:
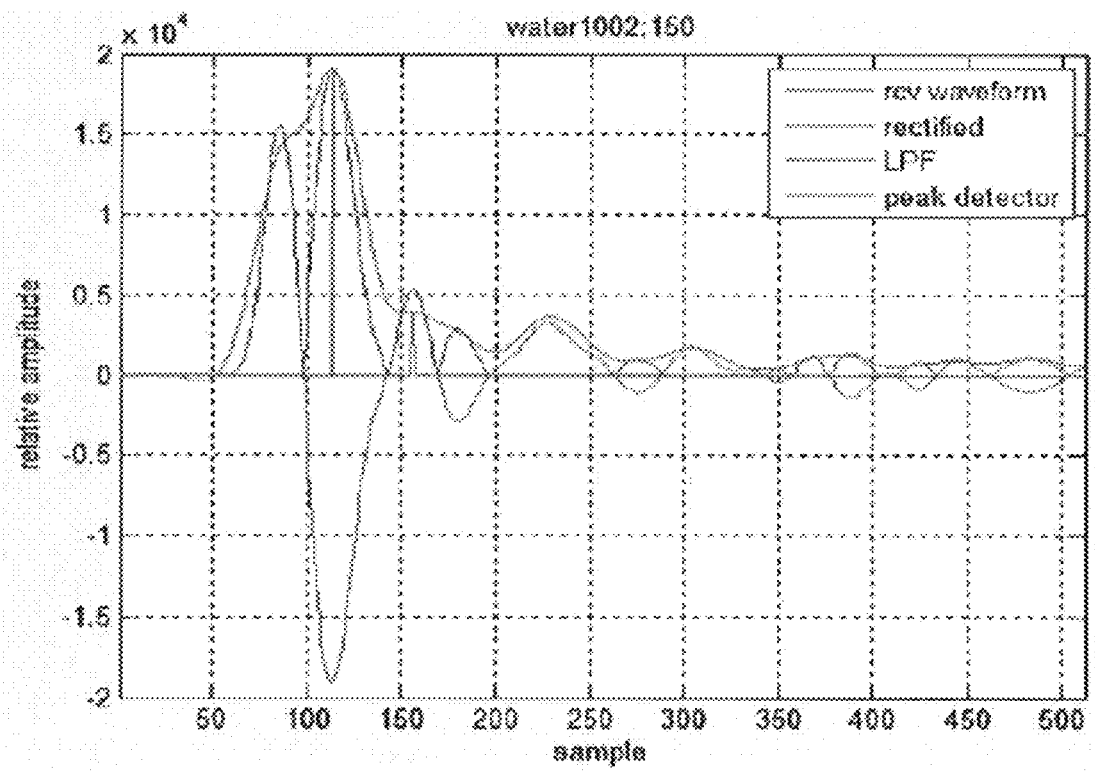
FIG. 6 is a graph of the signal processing of GPR trace 150 of the section shown in FIG. 4 in accordance with the present invention.

FIG. 6 shows the original trace 150 of the GPR section showing the response of the 3 distilled water targets. The figure shows the original trace in blue, the rectified trace in, the envelope of the reflections obtained with the low-pass filter, and the detected peaks in red.

Since the inversion algorithm determines $\Gamma_r$, the reflection coefficient of the target, using the ratio of the upward traveling wave $U_n$ to the downward traveling wave $D_n$ at the point in time when they are both impinging on a reflective interface, the magnitude of the transmit signal as radiated from the antenna must be precisely defined. Because of variations of transponder output, thermal drift, and the mismatching effect of the ground constitutive parameters in the proximity of the antennas, the magnitude of the radiated fields should be calculated from the traces taken with the antenna transponder in use. A good way of determining the relative amplitude of the transmitted voltage is to divide the amplitude of the surface reflection by the theoretical reflection coefficient $\Gamma_s$ that is expected from the surface. In order to calculate $\Gamma_s$ using Equation (16), the relative dielectric constant of the ground must be determined.

The dielectric constant of the subsurface (in this case the clean, dry sand of the test sandbox) can be determined from a velocity analysis using the hyperbola created by the target response to the GPR (see FIG. 4). The hyperbola is caused by the finite beam widths of the GPR antennas that pick up the target's reflection before they are directly over it, thereby making the propagation time longer and making the target appear deeper than it is.

Figure 7:
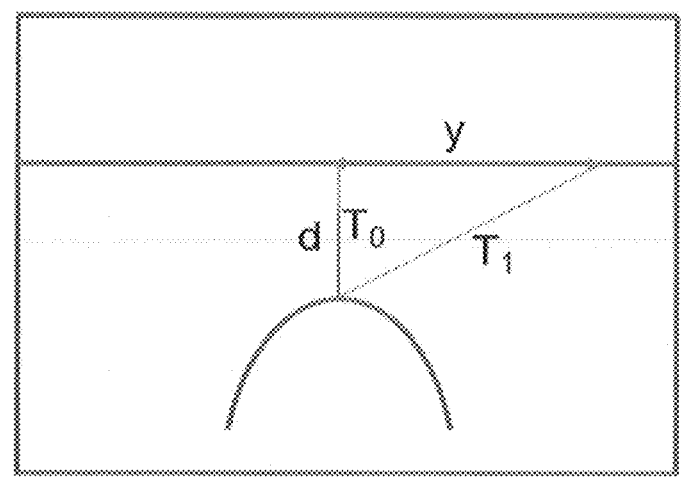
FIG. 7 shows the geometry for the propagation velocity analysis used to obtain ground relative permittivity in accordance with the present invention.

Rederived from [9], the geometry of the analysis is shown in FIG. 7. In the Figure, d is the unknown depth to the target, $T_0$ is the number of samples from the surface to the target which is known, y is the known distance offset from the first trace over the apex of the hyperbola to second trace near the apex, and $T_1$ is the number of samples from the surface to the target along this second trace, which is also known.

From FIG. 7, the velocity along the first trace over the hyperbola apex is $$v = \frac{2d}{dt \cdot T_0}, \quad (21)$$

where dt is the system sample time. The velocity along the second trace offset the apex is $$v = \frac{2\sqrt{d^2 + y^2}}{dt \cdot T_1}, \quad (22)$$

Using Equation (21), define d and insert into Equation (22)

$$v = \frac{2\sqrt{\frac{v^2(dt \cdot T_0)^2}{4} + y^2}}{dt \cdot T_1}. \quad (23)$$

From which the propagation velocity in the sand is calculated as $$v = \frac{2y}{dt\sqrt{T_1^2 - T_0^2}}. \quad (24)$$

Since the velocity of propagation in a dielectric other than free-space is defined as $$v = \frac{c}{\sqrt{\varepsilon_r}}, \quad (25)$$

where c is the speed of light (299792458 m/s), and $\in_r$ is the relative permittivity of the medium $$\varepsilon_r = \left(\frac{c}{v}\right)^2. \quad (26)$$

With the empirical calculation of the sand's relative permittivity, the amplitude of the transmit pulse can be calculated using Equations (1) and (16).

The last calibration necessary is to empirically determine the effective antenna distance, in sample number, from the ground surface. The exact value of this quantity is required in the geometric loss calculation.

Figure 8:
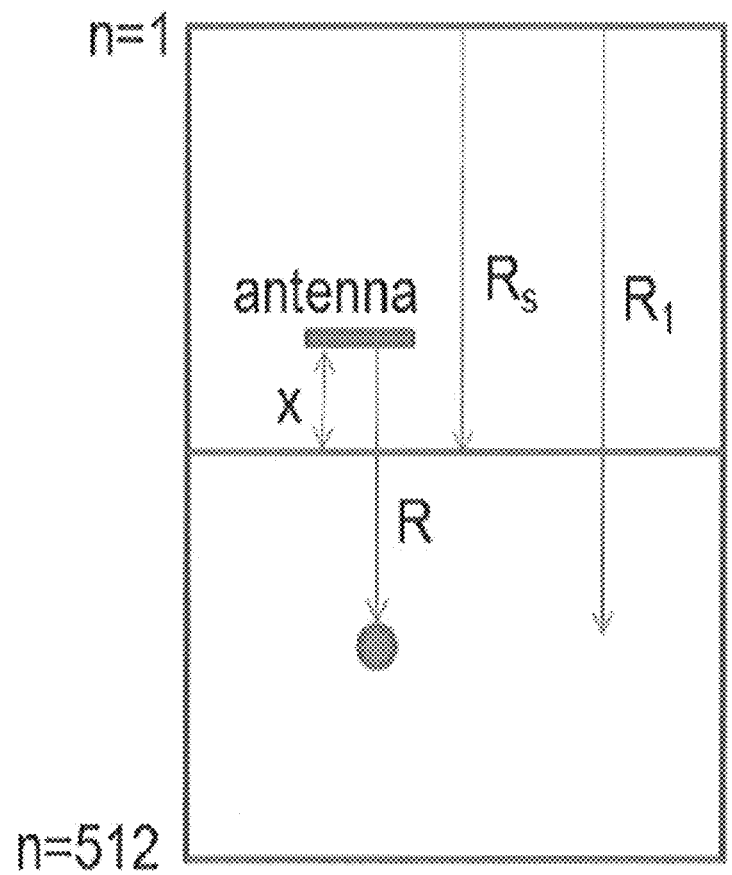
FIG. 8 shows the geometry of the antenna over the ground surface and variables used to calculate the antenna phase center distance from the ground surface in accordance with the present invention.

FIG. 8 shows the geometry of the antenna phase center over the half-space, and defines the variables $R_s$, $R_1$, x, and R. The known variables are $R_1$ and $R_2$. Including the antenna offset, x, the distance of the target from the surface is given as $$R = R_1 - R_s + x. \quad (27)$$

The geometric correction factor, from Equation (18), is thus $$GC_n = \left|\left[\frac{1}{(R_n - R_s + x)} + \frac{1}{ik(R_n - R_s + x)^2} - \frac{1}{k^2(R_n - R_s + x)}\right]^2\right|, \quad (28)$$

which simplifies to $$GC_n = \left|\left[\frac{1}{x} + \frac{1}{ikx^2} - \frac{1}{k^2 x}\right]^2\right| \quad (29)$$

for the surface reflection.

The peaks found, for example in FIG. 6, are divided by their corresponding correction factors $GC_n$ to compensate for their loss of amplitude due to geometric spreading. These corrected peak amplitudes, $P_s$ and $P_t$, correspond to the reflection coefficients of the surface target interfaces. The antenna offset x can be empirically adjusted to have $$\frac{P_t}{P_s} = \frac{\Gamma_t}{\Gamma_s} \quad (30)$$

since the reflection coefficients of the surface $\Gamma_s$ and of the target $\Gamma_t$ can be calculated from their known relative permittivity.

With determination of the antenna offset factor, the geometric spreading factor can be applied to the GPR data thereby transforming them to equivalent transmission line propagation data. Earlier, the data had been made impulsive by low-pass filtering and peak detection. These data can now be processed through the inversion algorithm to reconstruct the impedance profile of the subsurface.

Because the developed inversion and algorithm and transforms have only one heuristic parameter, namely the peak detector threshold value, the results are presented without any change in the calculated antenna offset distance x. Changes in threshold value parameter will be indicated. The sand permittivity changed slightly between experiments because of unearthing and reburial of the targets at different depths leading to slight changes in sand density. For example, the target analyzed in FIGS. 9 and 10 were tamped in, while the sand in subsequent measurements was left loose. Velocity analyses were performed for every burial to obtain the exact sand permittivity. It was necessary in these controlled experiments to precisely calculate the amplitude of the transmitted signal, which is critical to the inversion. If the transmitted amplitude of the GPR were to be known, velocity analyses would not be necessary.

Figure 9:
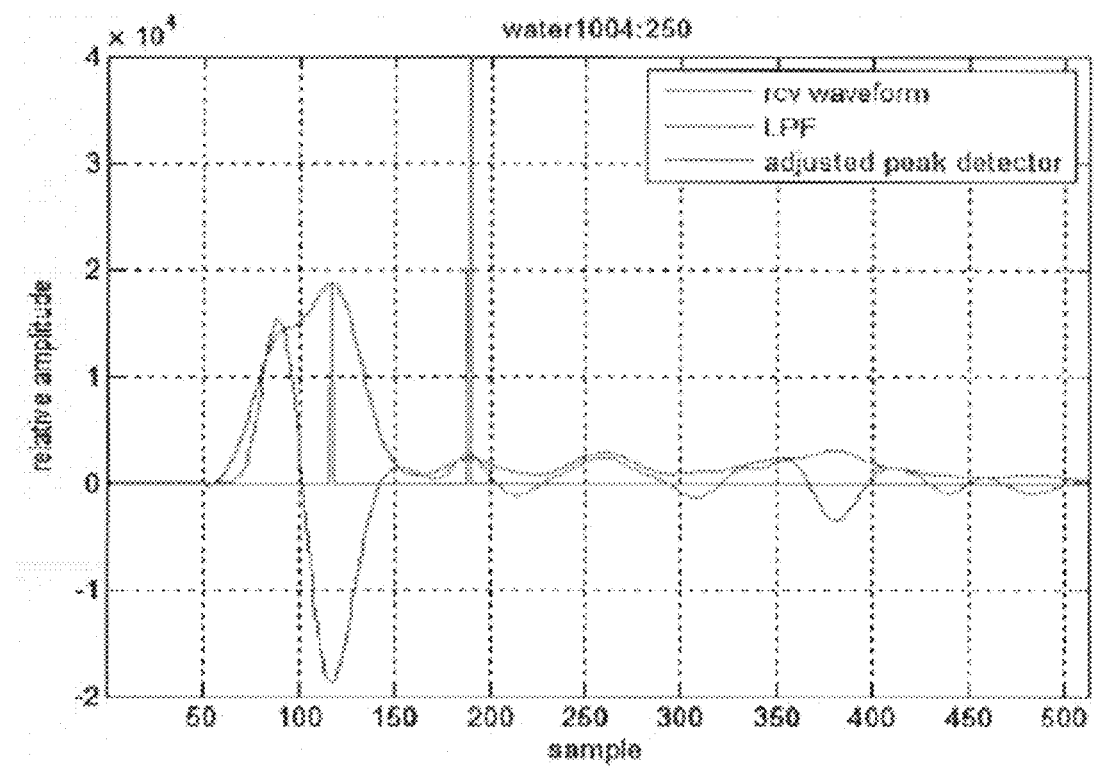
FIG. 9 is a graph of trace 250 over a distilled water bottle target buried 20 cm, its low-pass filtered envelope, and the geometrically corrected peak detection in accordance with the present invention.
Figure 10:
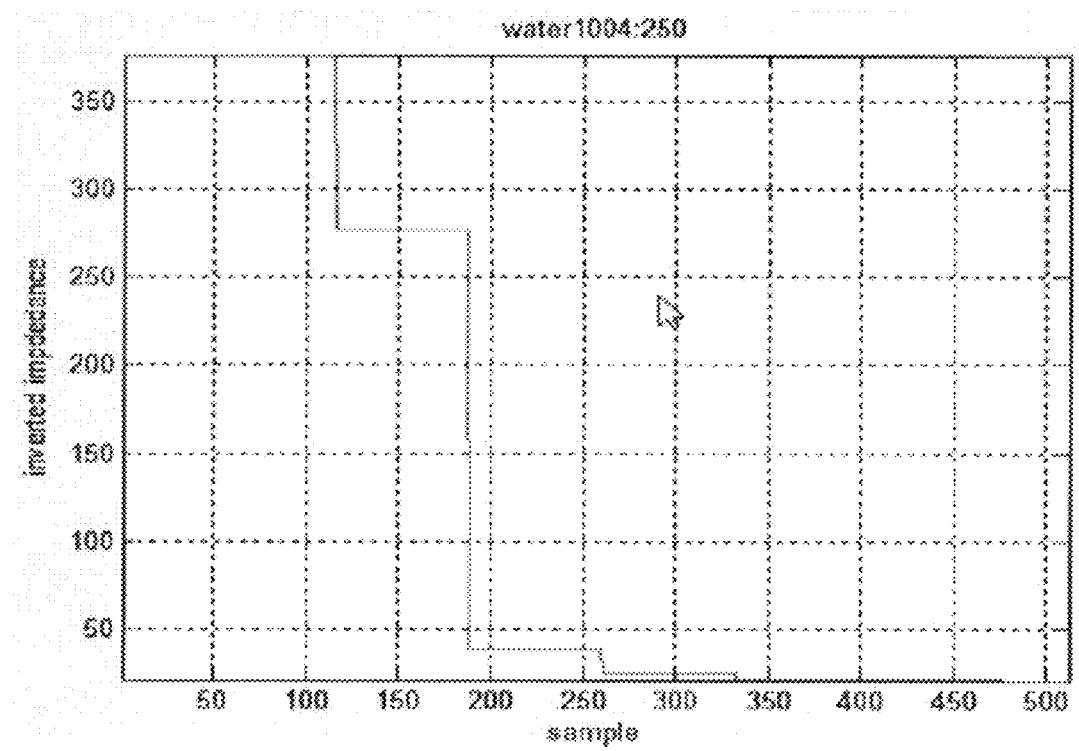
FIG. 10 is a graph of the impedance inversion of the trace over a distilled water target buried 20 cm in sand in accordance with the present invention.

With the transformation of the GPR data into an impulsive transmission line propagation signal, the data can be inverted using the layer-peeling method based inversion algorithm. FIG. 9 is the GPR trace over the small lab bottle filled with distilled water buried 20 cm. Superimposed on the trace is the low-pass filter envelope of the rectified trace as well as the surface and target reflection peaks adjusted for geometric spreading loss.

From the velocity analysis undertaken on this trace, the permittivity of the sand over the target was calculated as ($\in_r$=1.84). The excitation pulse constructed as the input to the inversion algorithm is a zero-vector with an impulse of adjusted amplitude as the first sample. The excitation pulse (D waveform) and the peak detections of the GPR data (U waveform) are passed to the inversion algorithm that returns an impedance profile. The trace shown in FIG. 9 yielded the impedance profile shown in FIG. 10.

The characteristic impedance of the transmission line is set in the inversion algorithm as $\eta$=377$\Omega$, the impedance of free space, which yields the inverted impedance of 377$\Omega$ for sample points 1 though 116. The inversion algorithm then obtains the impedance of the sand, defined by Equation (15), as 278$\Omega$ between samples 117 and 188. This calculated impedance is exact by virtue of the definition of the amplitude of the excitation pulse, which uses the sand relative permittivity calculated with the velocity analysis. The inversion algorithm next calculates the impedance of the distilled water target as 37.6$\Omega$ between samples 189 to 260. The impedance of the distilled water target is analytically calculated as 41.9$\Omega$, again using Equation (15). The reason for this slight impedance discrepancy may be due to the target being found in the beginning of the Fraunhofer radiation region where the E and H fields may not be completely orthogonal.

Instead of recovering the impedance of the sand in samples 189 to the bottom of the sandbox, the inversion fails to regain correct impedances beyond the water target. This is due to using only the first two reflections (the primary reflections) of the individual traces.

Figure 11:
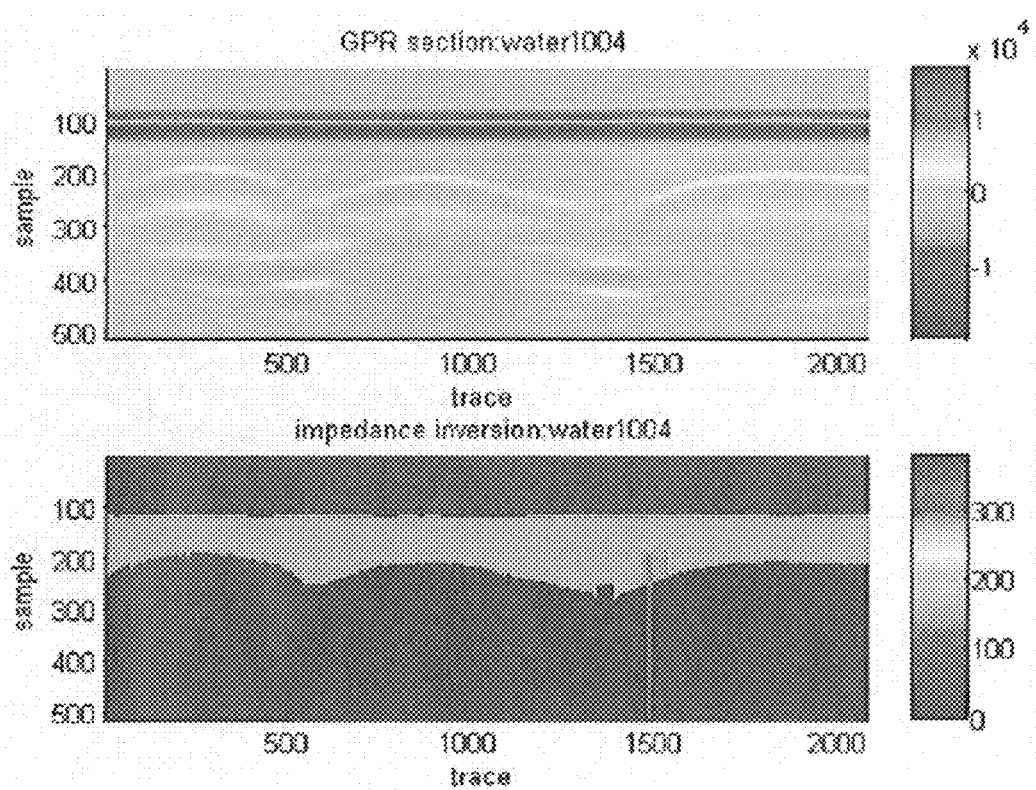
FIG. 11 are graphs of the GPR section and impedance inversion of the three distilled water bottle targets buried 20 cm in sand in accordance with the present invention.
Figure 12:
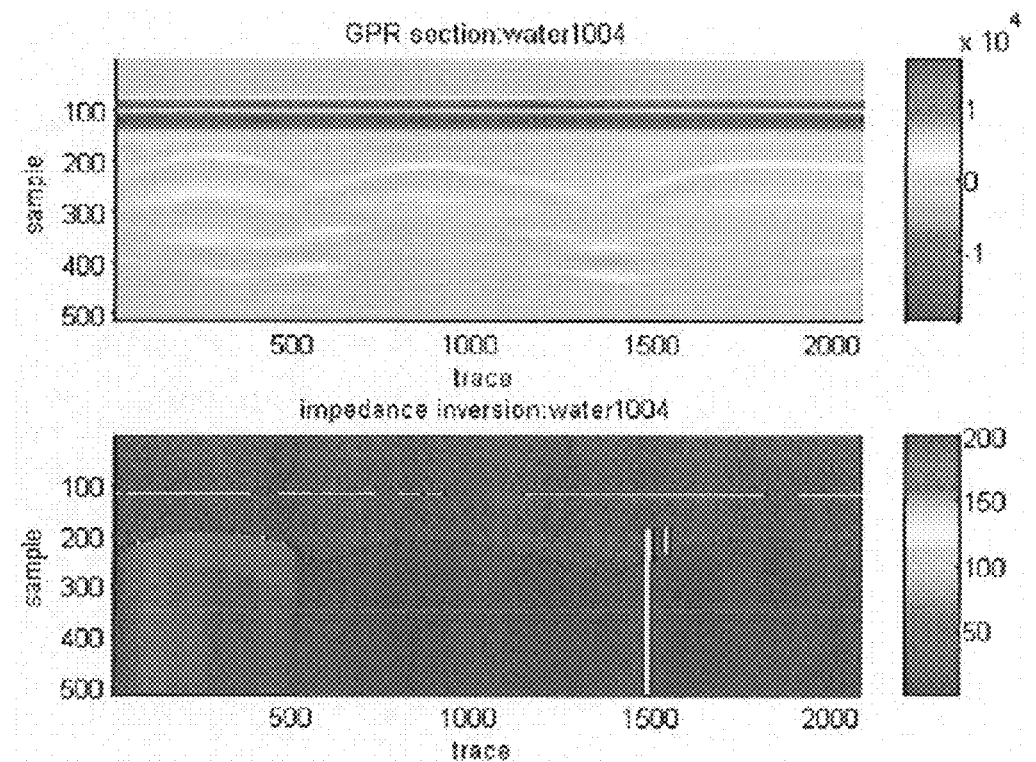
FIG. 12 are graphs of the GPR section and impedance inversion of three distilled water bottle targets buried 20 cm in sand in accordance with the present invention.

The trace inversion can be repeated on subsequent traces to invert the whole section. Staying with the section of the response of the three water bottle targets buried 20 cm in sand, FIG. 11 shows the GPR cross section and the impedance inversion of the section. If the color bar of the impedance inversion is restricted to allow closer examination of the calculated impedances, FIG. 12 shows the inversion algorithm to calculate the target impedances of the first two targets to be about 35$\Omega$. The color bar to the impedance inversion plot is restricted to better show the impedance values. The third water bottle target inverts to an impedance of about 20$\Omega$. The impedance of the distilled water targets is analytically calculated to be 41.8$\Omega$. The reason for the impedance deviation of the largest diameter target as compared to the others two may be due to a different sand permittivity, due in turn to non-uniform tamping.

Figure 13:
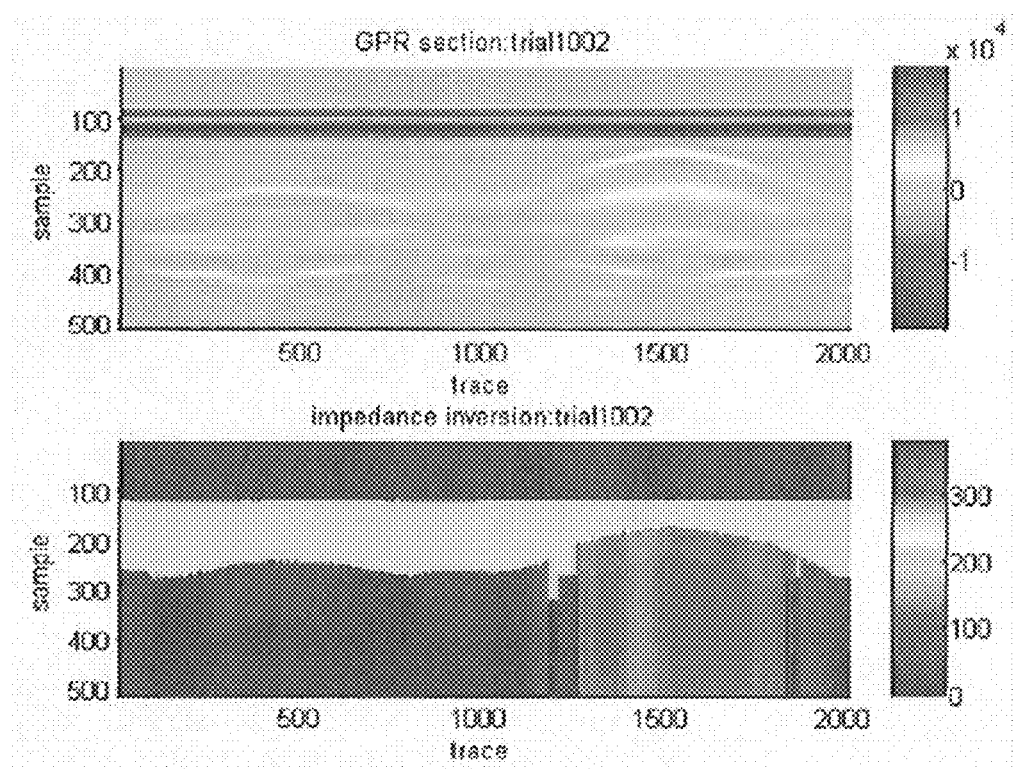
FIG. 13 are graphs of the GPR section and impedance inversion of two distilled water bottle targets buried 20 cm and 10 cm in sand in accordance with the present invention.

Finally, two plastic lab sample bottles (4 cm diameter) filled with distilled water were buried 20 cm and 10 cm in the sandbox, from left to right. The sand was not tamped down over these targets. A velocity analysis over the left target (buried 20 cm) yielded a permittivity of $\in_r$=1.37. FIG. 13 shows that the inversion was successful for most of the section, detecting depth of objects as well as inverting for the targets impedance. A substantial error is found in the inverted impedance of the shallow target buried 10 cm, since it is found in the Fresnel region, and whose impedance is defined using the Fraunhofer region definition.

Figure 14:
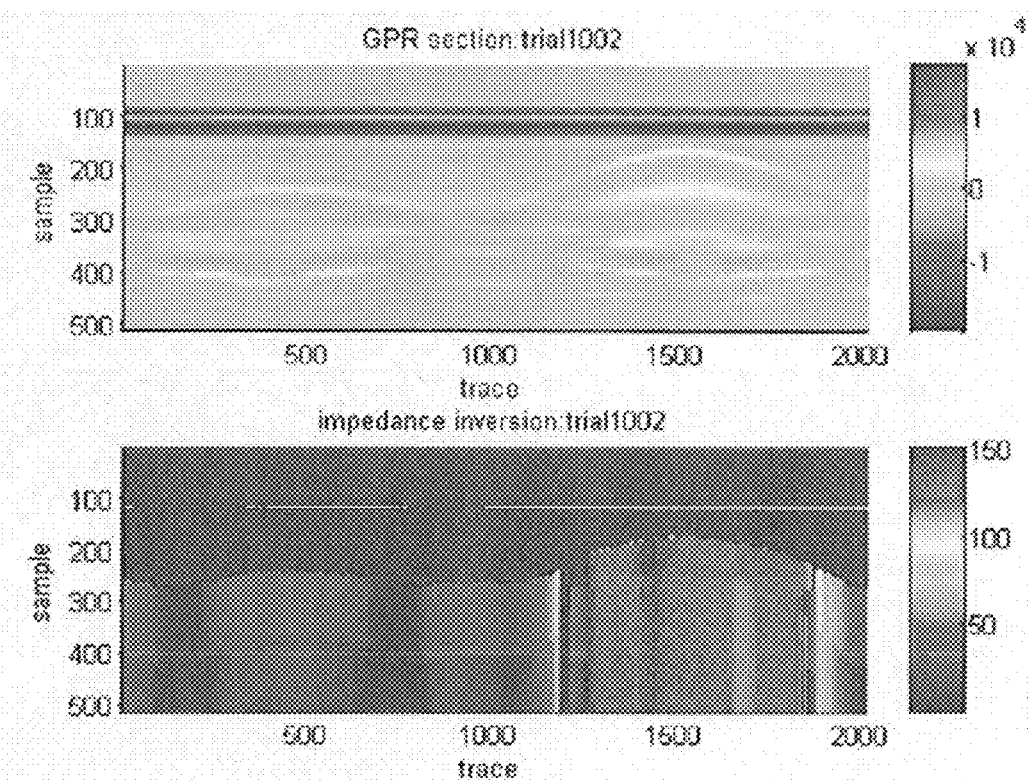
FIG. 14 are graphs of the GPR section and impedance inversion of two distilled water bottle targets buried 20 cm and 10 cm in sand in accordance with the present invention.

The same plot with the restricted color bar is shown in FIG. 14 shows the 10 cm target to invert to about 130Ω while the deeper target inverts to an impedance of about 37.6Ω. The color bar to the impedance inversion plot is restricted to better show the impedance values. Again, it is thought that the error of the shallow target inversion values is due to the far-field impedance definition of the dielectric targets used.

Figure 15:
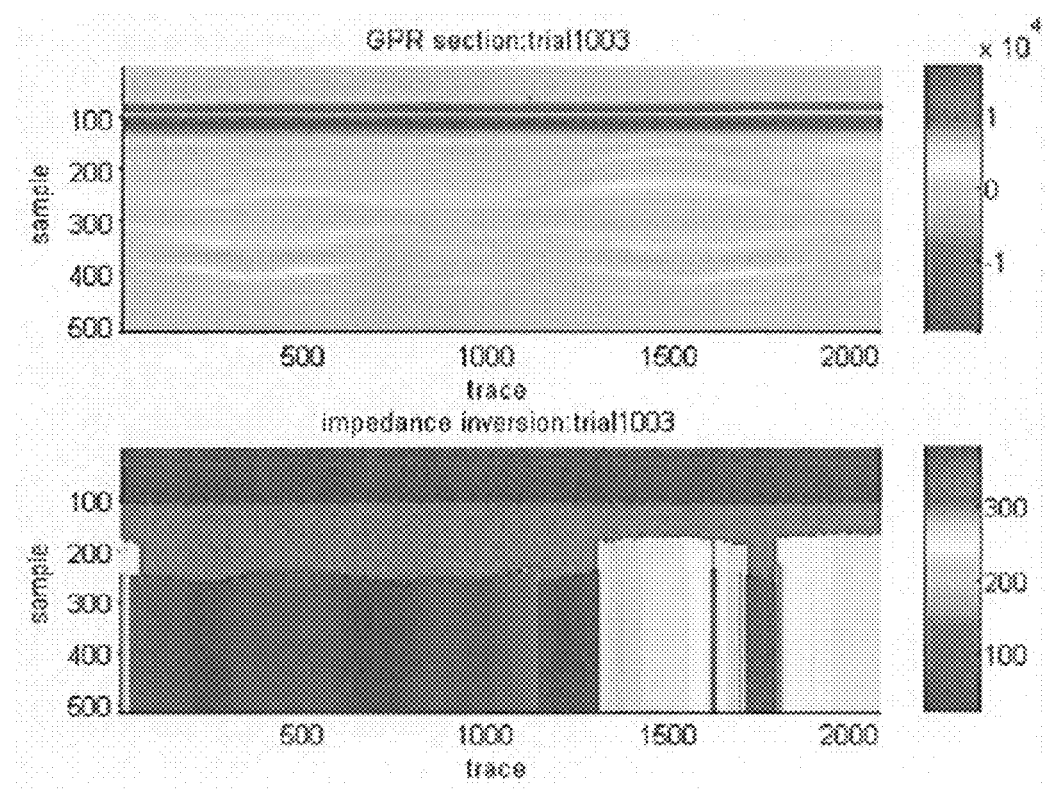
FIG. 15 are graphs of the GPR section and impedance inversion of ethanol bottle targets buried 20 cm and 10 cm in sand in accordance with the present invention.

As stated earlier, the response of other, less contrasting targets buried in the sandbox were also recorded with the GPR. Ethanol ($\in_r$=24.3), methanol ($\in_r$=33.1), and glycol ($\in_r$=37) were poured in the small plastic lab bottles (4 cm diameter) and buried in the sandbox. FIG. 15 is the GPR section of two ethanol targets, buried at 20 cm and 10 cm, form left to right. The smaller contrast of the ethanol as compared to that of water is immediately apparent from the top figure. Because of the lower permittivity contrast between the ethanol and the sand, the heuristic threshold parameter was reduced in the MATLAB peak detector function. The threshold value was kept lower to invert the impedance of all non-aqueous targets. Velocity analysis over the target buried 20 cm yielded a permittivity of $\in_r$=1.29. Because of the lower contrast and the need of a lower threshold, some false targets are included in the inversion.

Figure 16:
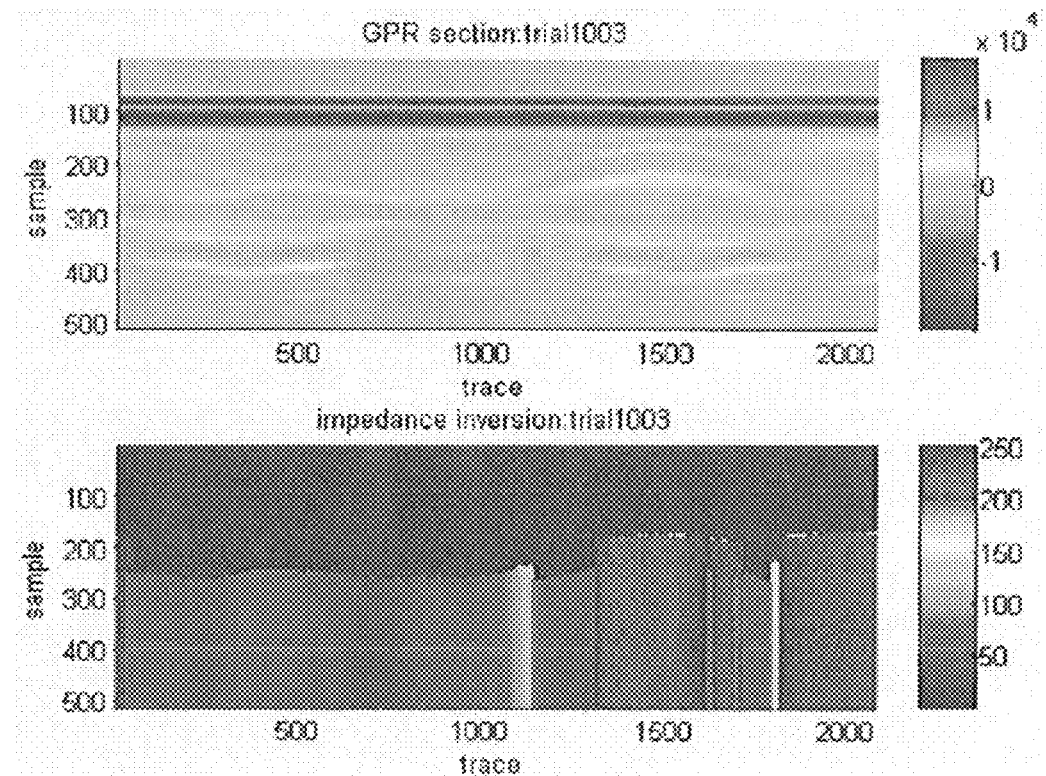
FIG. 16 are graphs of the GPR section and impedance inversion of ethanol bottle targets buried 20 cm and 10 cm in sand in accordance with the present invention.

If the MATLAB color bar range is restricted in the impedance inversion plot to more closely examine the inversion values, see FIG. 16, the actual inversion values can be better interpreted. The color bar to the impedance inversion plot is restricted to better show the impedance values. The inversion for the impedance of the ethanol of the target buried 20 cm, is about 70Ω, while the analytic impedance of the target, as calculated with Equation (15), is 76.5Ω. The shallow (10 cm) target yields erroneous impedance inversion because it is found in the Fresnel region while its impedance definition used a far-field approximation.

Figure 17:
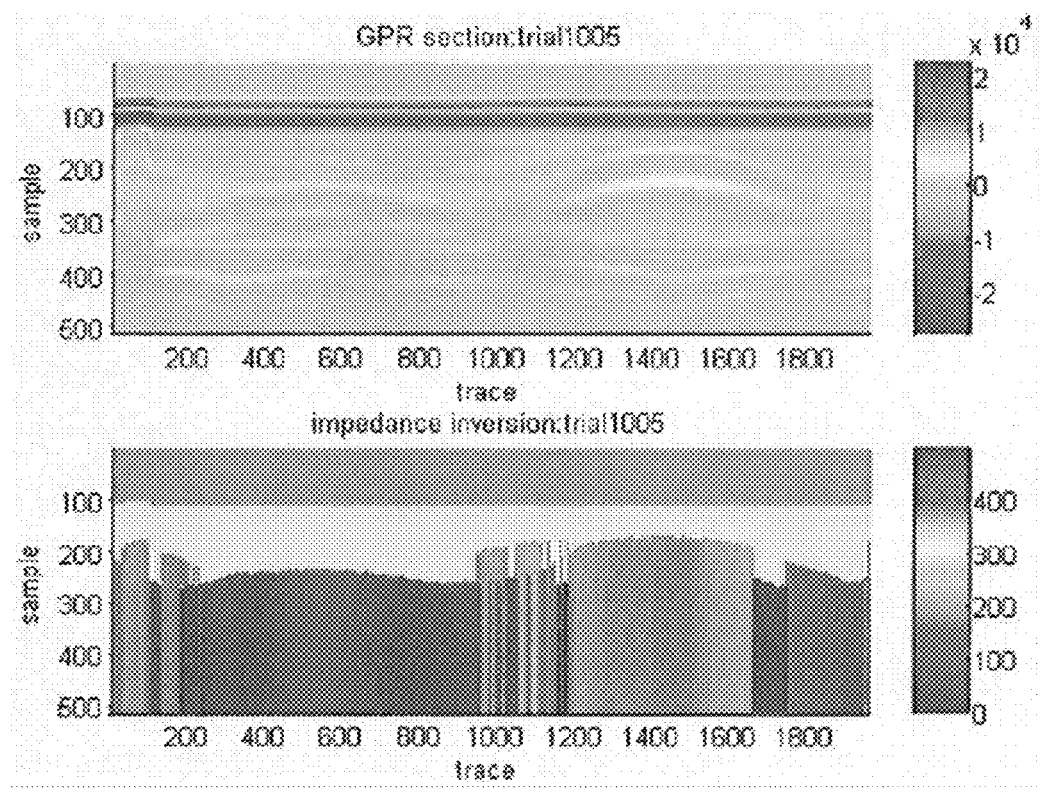
FIG. 17 are graphs of the GPR section and impedance inversion of methanol bottle targets buried 20 cm and 10 cm in sand in accordance with the present invention.
Figure 18:
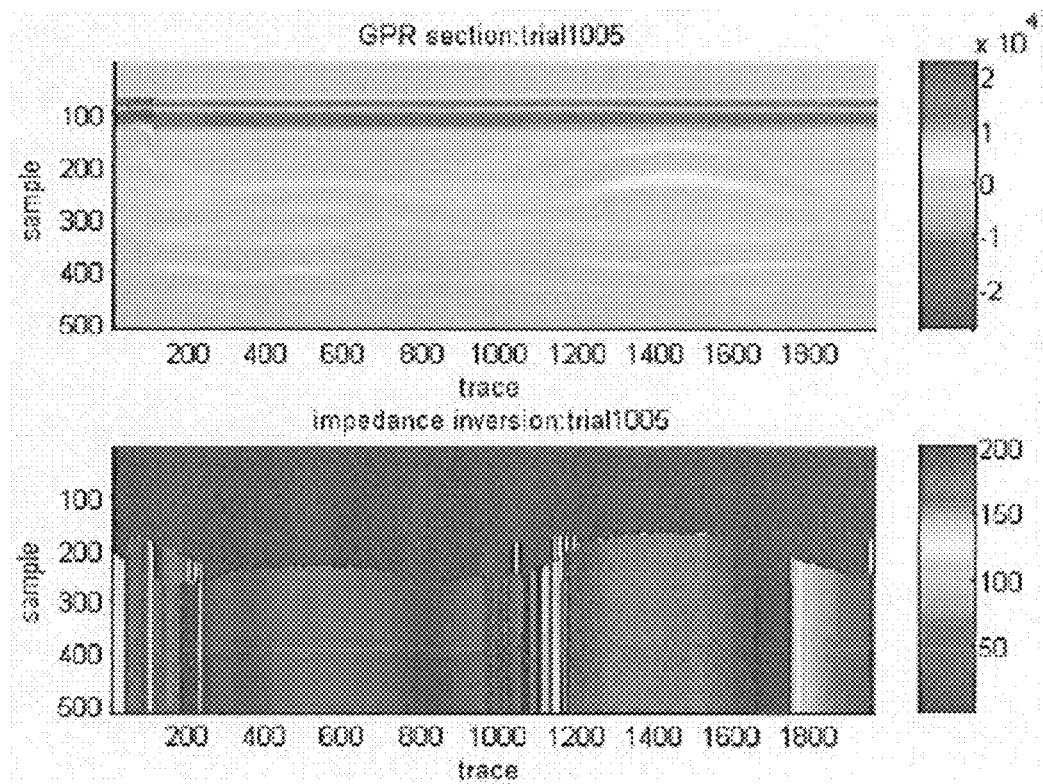
FIG. 18 are graphs of the GPR section and impedance inversion of methanol bottle targets buried 20 cm in sand in accordance with the present invention.

Next the methanol ($\in_r$=33.1) targets were buried at 20 cm and 10 cm. Velocity analysis calculated a sand permittivity of $\in_r$=1.35. FIG. 17 shows the GPR section and its impedance inversion. Because of a slightly larger permittivity contrast than ethanol, the inversion seems to do a little better in picking out the depth to target. A restriction of the color bar in the methanol impedance inversion plot (see FIG. 18) shows that the algorithm inverts the methanol to an impedance of about 65Ω when Equation (15) predicts 65.5Ω. The color bar to the impedance inversion plot is restricted to better show the impedance values. Once again, the impedance of the shallow target inverts erroneously because it is found in the Fresnel radiation region.

Figure 19:
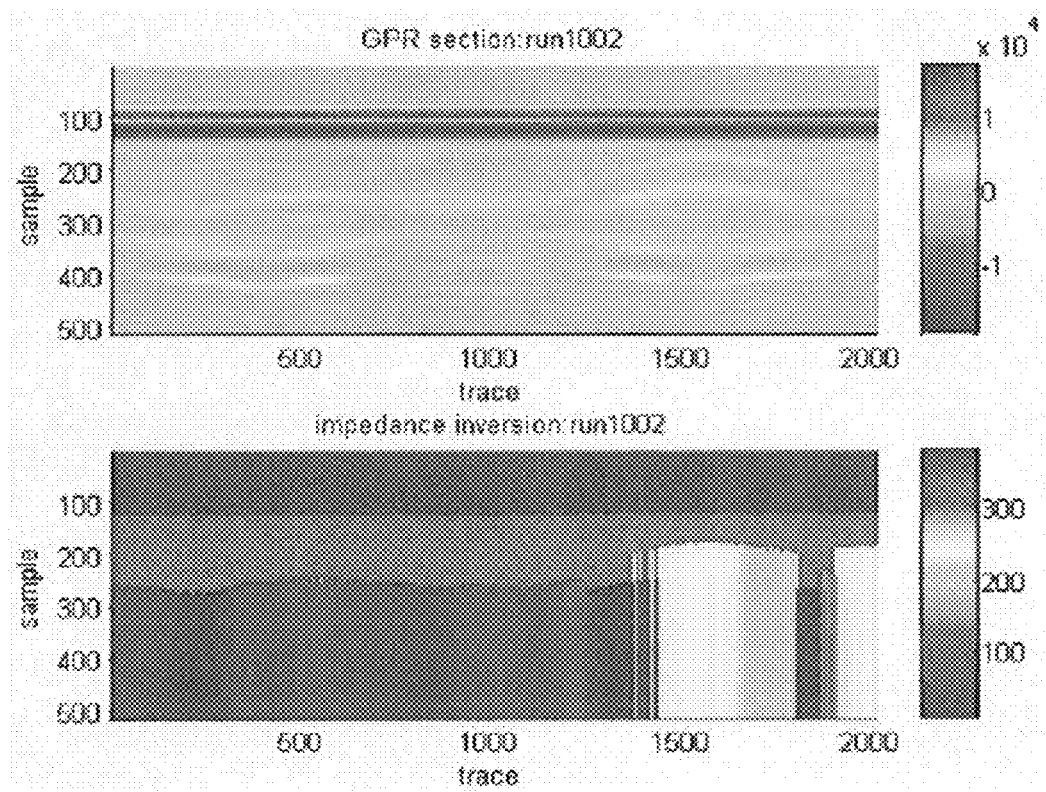
FIG. 19 are graphs of the GPR section and impedance inversion of ethylene glycol bottle targets buried 20 cm and 10 cm in sand in accordance with the present invention.
Figure 20:
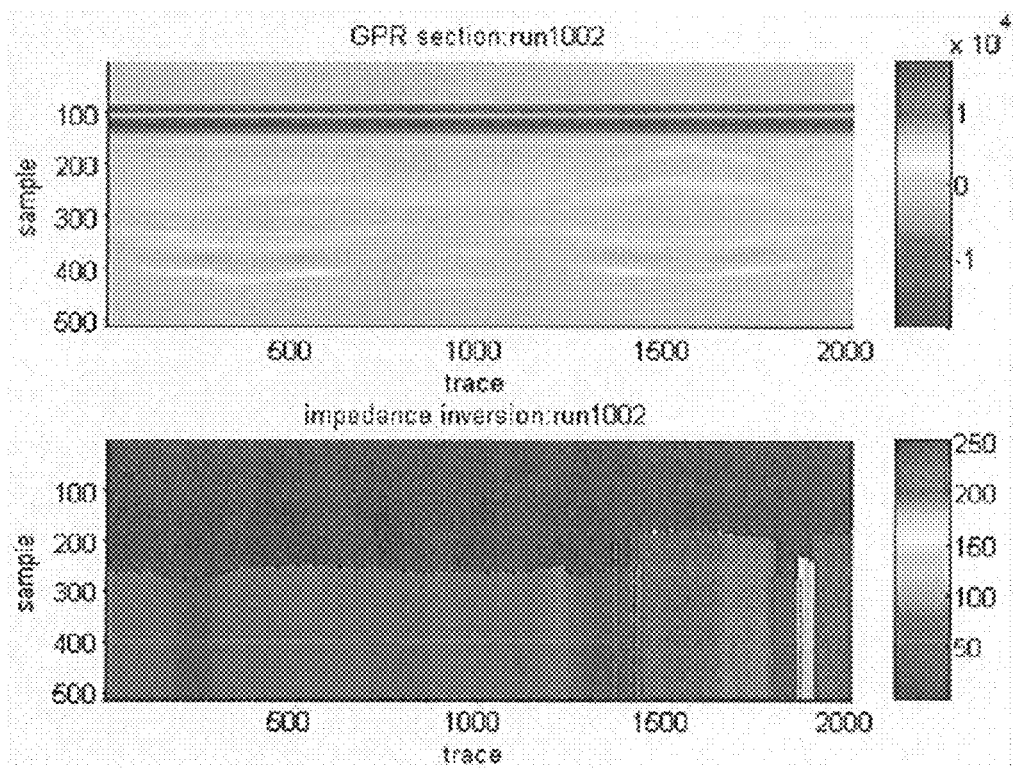
FIG. 20 are graphs of the GPR section and impedance inversion of ethylene glycol bottle targets buried 20 cm and 10 cm in sand in accordance with the present invention.

Finally, the ethylene glycol ($\in_r$=37) targets were buried at 20 cm and 10 cm depths. Velocity analysis calculated a sand permittivity of $\in_r$=1.33. FIG. 19 shows the GPR section and its impedance inversion. Because of yet higher permittivity contrast between the ethylene glycol and the sand, the targets should be well detected. Yet, the section of the GPR response of the ethylene glycol targets in FIG. 20 does not show a large target response. The color bar to the impedance inversion plot is restricted to better show the impedance values. This raises doubt about the relative permittivity of the ethylene glycol used. The inverted impedance is calculated at about 75Ω when Equation (15) calls for an impedance of 62Ω). The ethylene glycol target buried 10 cm does not invert well (Z=100Ω), due to it being buried in the Fresnel radiation region.

It has been shown that a trace-wise inversion of GPR data to display the effective impedance of dielectric targets is possible. Data of target having various permittivities were successfully inverted when the targets were found in the far-field radiation region. Fresnel radiation region definition of dielectric impedance is necessary to make the inversion general. The inversion is approximate, deferring rigor to speed of execution. With further refinement of the method, the inversion algorithm will be useful in complimenting the ATR module in conjunction with tradition shaped-based methods to reduce the number of missed targets-of-interest, and to reduce the amount of false alarms of detected targets.

In summary, the present invention inverts a GPR for the constitutive parameters of buried lossy dielectric targets. The temporal transmission line model used for the inversion works with the classic "layer-peeling" method. This transmission line model propagates an impulsive waveform through a piecewise continuous segmented transmission line. Using this propagation model, and knowing the excitation and reflected waveforms, the impedance profile of the transmission line was reconstructed. The reflected waveform can be complex, and the inversion algorithm will unambiguously reconstruct the real (resistance) and imaginary (reactance) components of the transmission line impedance.

To develop the inversion algorithm, a forward scattering method was needed that would synthesize the impulse response of a segmented transmission line knowing only the length and impedances of the transmission line segments. A forward model, which also uses the layer-peeling propagation method, was found and adapted to work numerically by changing the delay and advance functions of the method from z-transform to Fourier transform operators. Leveraging the highly optimized fast Fourier transforms in MATLAB allowed the synthesis of the full impulsive forward scatter solution of a segmented transmission line that includes secondary and tertiary reflections.

After the development of the forward scatter and inversion algorithms, GPR data of known targets were needed to begin to test the inversion code on actual data. The non-impulsive nature of the GPR signal, as well as the complicated structure of the subsurface found after the first data collection effort (in an urban lot environment), indicated that more control was needed over the GPR/target environment to successfully interpret and transform the resulting data to prepare them for inversion.

A sandbox was constructed to bury the targets at known depths, in a known medium. With this level of control, it was possible to analyze the reflection coefficients of the surface and of the targets, and the geometric spreading loss included in the reflected signal. It was found that the GPR operates mostly in the radiation near-field (Fresnel) region which complicates the analysis of the inversion algorithm. It was possible to calculate the propagation velocity of the GPR signal through the sand from which the relative permittivity of the sand was calculated. This was necessary to calculate the excitation pulse amplitude critical for inversion algorithm success.

Once the sandbox geometry and constitutive parameters of the sand and targets were well understood, an algorithm was written to transform the GPR field data into impulsive lossless transmission line reflection data by accounting for the ohmic attenuation and the geometric spreading loss of the electromagnetic GPR data. Since the IED and land mine targets are expected to be found in the Fresnel and early Fraunhofer regions of the GPR antennas, no far-field approximations are allowed in the geometric spreading formulation. The need for the exact amplitudes of the received signal imply that the electrical distance of the target from the GPR antenna must be precisely known. The effective electrical distance of the antenna phase center to the ground surface must be included in this distance.

The GPR data was transformed into impulsive data by using a peak detector function in MATLAB. To remove the oscillatory behavior of the excitation pulse (a Ricker wavelet, the $2^{nd}$ derivative of a Gaussian distribution), the reflected waveform was rectified and passed through a low-pass filter. To remove any ambiguity caused by multiple reflections and to allow the application of geometric spreading loss correction, only the two first reflection (the surface and the target reflections) were used in the inversion. This method to transform GPR field data into impulsive transmission propagation data was chosen for simplicity (and thus speed) of the transformation rather than for its rigor.

With the field data transformed into impulsive waveforms reflected from a sectioned transmission line, they were passed through the inversion algorithm to obtain the impedance of reflectors. Each trace of the GPR section was inverted sequentially until an impedance profile of the subsurface emerged. Profiles of targets having different permittivity were inverted and the inversion results compared to theoretical.

Targets of interest, namely IED components and land mines, are in the antennas near-field Fresnel radiation region. The transformation of the GPR field quantities to the transmission line inversion algorithm depended on values that were implicitly dependent on the orthogonality of the E and H fields, embodied in the impedance of free-space variable $\eta$. While $\eta$ cancels out of some calculated quantities such as the reflection coefficient $\Gamma$, it persists in other quantities such as the effective impedance of a dielectric Equation (15). This produces an impedance inversion error when inverting the parameters of targets found in the Fresnel region (e.g. inversely proportional to depth of burial).

The commercial GSSI GPR was used in single channel mode. Even though two channels exist on the GSSI SIR-System 20 GPR receivers, only one 1.6 GHz antenna was available. Because the data were taken from a single channel receiver, only the amplitudes of the reflected signals were available. From amplitude analysis, target impedances were inverted for, but the separation of target conductivity from target permittivity remains elusive. It was thought that enough frequency content was available in the signal to perform the inversion analysis at two frequencies, perhaps separating the signals with different cut-off frequency values in the low pass filter, to obtain two independent impedance inversion of the same trace, and using these to solve for conductivity and permittivity. At the 1.6 GHz center frequency used, the predominant reflection mechanism of lossy dielectrics targets is the permittivity of the target, and therefore not much analysis of the material conductivities has been done other than applying an initial estimate.

Because the GPR used was a commercial unit, the amplitude of the transmitted signal is not recorded, as it is unnecessary in conventional GPR surveys. Knowledge of the amplitude of the transmitted signal, however, is crucial to the inversion algorithm. Without this knowledge, a velocity analysis on the target hyperbolas was necessary to determine the permittivity of the sand to calculate the surface reflection coefficient $\Gamma_\delta$. With $\Gamma_\delta$, the transmission signal amplitude could be recreated. A calibrated sensor near the transmit antenna could provide the precise amplitude of the transmit signal, and would mitigate the need for the velocity analysis and the associated increase in error margin.

Application of the geometric spreading loss correction assumes that the total distance between the antenna and the target is known or calculable. This distance can be ambiguous when secondary and tertiary reflections are considered. This necessitates using only the primary reflections for the inversion. When only the primary reflections of the ground surface and the target are used, the inversion cannot recover from the target impedance (i.e. back to impedance of the soil under the target). Also, the lack of a full-wave inversion may introduce error in the target impedance calculated, as reflections sometimes add constructively or cancel out in the received waveform.

The threshold parameter of the peak detection function intrinsic to MATLAB is heuristic, and must be adjusted depending on the target contrast in the GPR section. Perhaps amplitude detection routines could be applied to the data to optimize the threshold value, but these would slow the tracewise impedance inversion routines away from near real-time.

Finally, a lot of interpretive information is lost without the coherent synchronization of target returns from adjacent traces. For example, hyperbolas in GPR sections are very characteristic of a compact target, and are extremely helpful in distinguishing a target return from a multiple reflection, multi-path, or a sustained resonance. A lot of signal to noise ratio increase that comes from "stacking" adjacent traces is lost by inverting a single trace at a time. This decrease in the signal to noise ratio is intrinsic to the process, and is a trade-off to near real-time execution.

The present invention as described above can be modified to incorporate the formulation for the effective impedance of a dielectric target found in the Fresnel radiation region, to customize the peak detector function to be better suited to GPR inversion, to repeat the inversion using GPR data obtained in an uncontrolled environment (such as along a roadside), to separate the inverted target conductivity from inverted target permittivity values, and to migrate the MATLAB inversion algorithm to a faster environment that allows the permanent compilation of the transformation and inversion codes.

Figure 21:
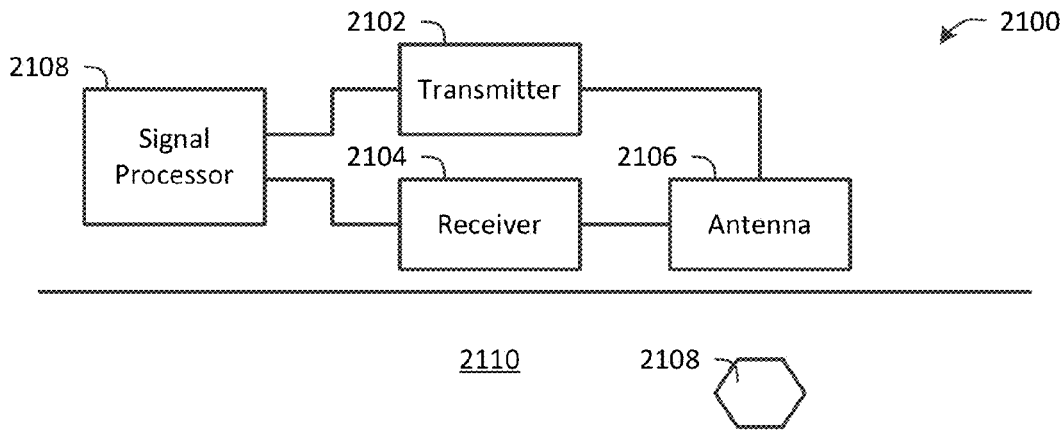
FIG. 21 is a block diagram of a ground penetrating radar in accordance with one embodiment of the present invention.

Now referring to FIG. 21, a block diagram of a ground penetrating radar 2100 in accordance with one embodiment of the present invention is shown. The ground penetrating radar 2100 includes a transmitter 2102, a receiver 2104, an antenna 2106 communicably coupled to the transmitter 2102 and the receiver 2104, and a signal processor 2108 communicably coupled to the transmitter 2102 and the receiver 2104. The signal processor 2108 receives a reflectivity data from two or more subsurface reflectors 2108 and 2110, calculates an impedance data for the two or more subsurface reflectors 2108 and 2110 by inverting the reflectivity data using a temporal transmission line model with a "layer-peeling" method, calculates one or more constitutive parameters of the two or more subsurface reflectors 2108 and 2110 based on the impedance data, and detects the one or more subsurface targets 2108 based on a change in the one or more constitutive parameters. The two or more subsurface reflectors 2108 and 2110 may include the one or more subsurface targets 2108 and a medium 2110 surrounding the one or more subsurface targets 2108. The reflectivity data typically includes one or more individual traces and the impedance data is calculated one individual trace at a time. The calculation and detection steps are performed in near real time. The one or more constitutive parameters may include a permittivity, a conductivity or both. The detection step may include displaying a waterfall plot of the one or more subsurface targets, or identifying the one or more subsurface targets or one or more properties of the one or more subsurface targets. The one or more properties may include a permittivity, a conductivity, a moisture content, a salinity, a fluid flow rate, or a combination thereof.

The one or more subsurface targets 2108 may include one or more lossy dielectric targets, one or more subsurface targets comprise an IED, a non-metallic mine, a non-polar fluid spill, a dielectric solid, a dielectric fluid, a dielectric gas, a liquid in a pipe, or a combination thereof. The signal processor may perform other steps, such as calibrating a magnitude of a radiated field from an antenna transponder in use, adjusting the temporal transmission line model by setting a characteristic impedance of the medium, adjusting the temporal transmission line model by correcting for a geometric spreading of a propagating electromagnetic wave, and/or adjusting the temporal transmission line model by including an ohmic attenuation of a propagating electromagnetic wave.

Figure 22:
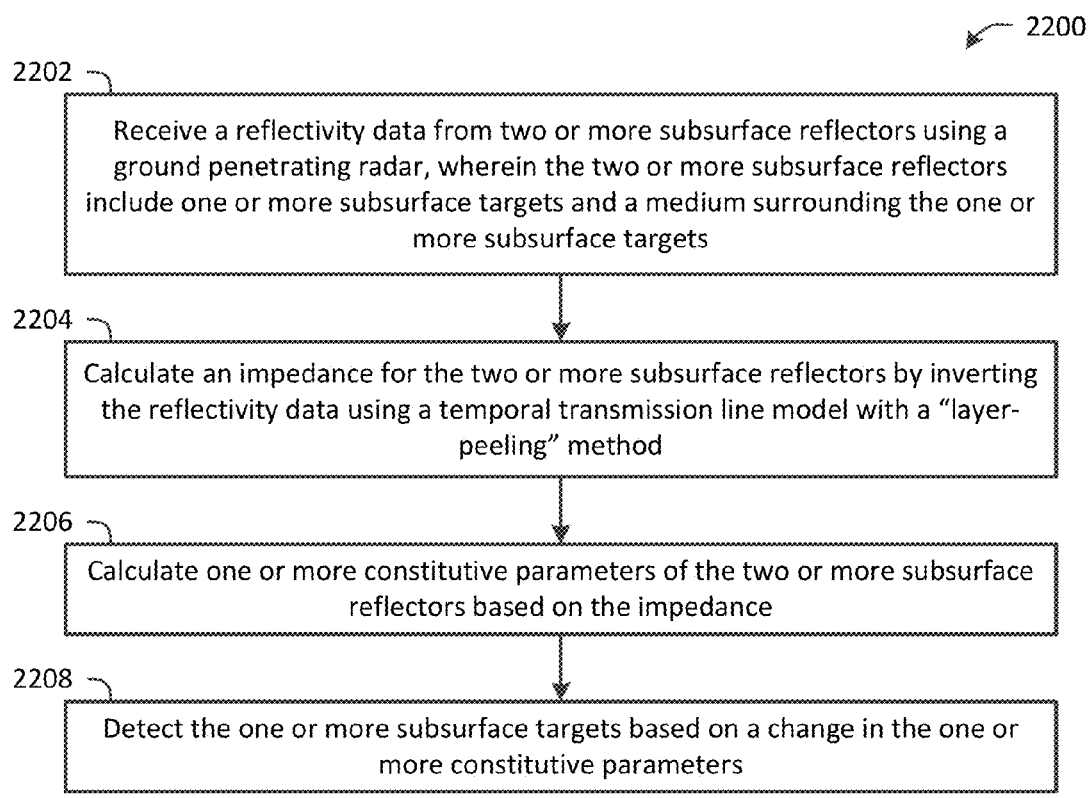
FIG. 22 is a flow chart of a method for detecting one or more subsurface targets in accordance with another embodiment of the present invention.

Referring now to FIG. 22, a flow chart of a method 2200 for detecting one or more subsurface targets in accordance with another embodiment of the present invention is shown. A reflectivity data is received from two or more subsurface reflectors using a ground penetrating radar in block 2202. The two or more subsurface reflectors may include the one or more subsurface targets and a medium surrounding the one or more subsurface targets. The reflectivity data typically includes one or more individual traces and the impedance data is calculated one individual trace at a time. An impedance data for the two or more subsurface reflectors is calculated by inverting the reflectivity data using a temporal transmission line model with a "layer-peeling" method in block 2204. One or more constitutive parameters of the two or more subsurface reflectors are calculated based on the impedance data in block 2206. The calculation and detection steps are performed in near real time. The one or more constitutive parameters may include a permittivity, a conductivity or both. The one or more subsurface targets are detected based on a change in the one or more constitutive parameters in block 2208. The detection step may include displaying a waterfall plot of the one or more subsurface targets, or identifying the one or more subsurface targets or one or more properties of the one or more subsurface targets. The one or more properties may include a permittivity, a conductivity, a moisture content, a salinity, a fluid flow rate, or a combination thereof. The method can be implemented as a computer program embodied on a non-transitory computer readable medium wherein each step is performed by one or more code segments. Moreover, the method can be implemented as a module added to an existing ground penetrating radar.

The one or more subsurface targets may include one or more lossy dielectric targets, one or more subsurface targets comprise an IED, a non-metallic mine, a non-polar fluid spill, a dielectric solid, a dielectric fluid, a dielectric gas, a liquid in a pipe, or a combination thereof. Other steps may include calibrating a magnitude of a radiated field from an antenna transponder in use, adjusting the temporal transmission line model by setting a characteristic impedance of the medium, adjusting the temporal transmission line model by correcting for a geometric spreading of a propagating electromagnetic wave, and/or adjusting the temporal transmission line model by including an ohmic attenuation of a propagating electromagnetic wave.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

REFERENCES

[1] Niitek URL, HTTP://www.niitek.com/features.php
[2] Mr. Ron Wardell, Army Research Laboratory, Sensors and Electron Devices Directorate, Personal communication.
[3] Bruckstein, A. M., T. Kalaith, 1987, Inverse Scattering for Discrete Inversion-Line Models, SIAM Review, V29, #3, pp 359-389.
[4] Frolik, J. L., A. E. Yagle, 1997, Forward and Inverse Scattering for Discrete Layered Lossy and Absorbing Media, IEEE Trans. Circuits and Systems-II: Analog and Digital Signal Processing, V 44, #9, pp 710-722.
[5] Burkhart, S. C., R. B. Wilcox, 1990, Arbitrary Pulse Shape Synthesis via Nonuniform Transmission Lines, IEEE Trans. MTT, V38, #10, pp 1514-1518.
[6] Balanis, C. A., 1982, *Antenna Theory, Analysis and Design*, Harper and Row, p 103, p 118.
[7] Schutz, Alan, E., Vice President for Technology, Geophysical Survey Systems, Inc., Personal communication.
[8] Balanis, C. A., 1989, *Advanced Engineering Electromagnetics*, John Wiley and Sons, p 150.
[9] Daniels, David, 2004, *Ground Penetrating Radar (2nd Edition)*, IEE Radar, Sonar, and Navigation Series, p 21.

What is claimed is:

1. A computer program embodied on a non-transitory computer readable medium for detecting one or more subsurface targets comprising:
   a code segment for receiving a reflectivity data from two or more subsurface reflectors using a ground penetrating radar, wherein the two or more subsurface reflectors comprise the one or more subsurface targets and a medium surrounding the one or more subsurface targets;
   a code segment for calculating an impedance data for the two or more subsurface reflectors by inverting the reflectivity data using a temporal transmission line model with a "layer-peeling" method;
   a code segment for calculating one or more constitutive parameters of the two or more subsurface reflectors based on the impedance data; and
   a code segment for detecting the one or more subsurface targets based on a change in the one or more constitutive parameters.

2. The computer program as recited in claim 1, wherein the reflectivity data comprises one or more individual traces and the impedance data is calculated one individual trace at a time.

3. The computer program as recited in claim 1, wherein the calculation and detection steps are performed in near real time.

4. The computer program as recited in claim 1, wherein the one or more constitutive parameters comprise a permittivity, a conductivity or both.

5. The computer program as recited in claim 1, wherein the code segment for detecting the one or more subsurface targets comprises a code segment for displaying a waterfall plot of the one or more subsurface targets.

6. The computer program as recited in claim 1, wherein the code segment for detecting the one or more subsurface targets further comprises a code segment for identifying the one or more subsurface targets or one or more properties of the one or more subsurface targets.

7. The computer program as recited in claim 6, wherein the one or more properties comprise a permittivity, a conductivity, a moisture content, a salinity, a fluid flow rate, or a combination thereof.

8. The computer program as recited in claim 1, wherein the one or more subsurface targets comprise one or more lossy dielectric targets.

9. The computer program as recited in claim 1, wherein the one or more subsurface targets comprise an IED, a non-metallic mine, a non-polar fluid spill, a dielectric solid, a dielectric fluid, a dielectric gas, a liquid in a pipe, or a combination thereof.

10. The computer program as recited in claim 1, further comprising a code segment for calibrating a magnitude of a radiated field from an antenna transponder in use.

11. The computer program as recited in claim 1, further comprising a code segment for adjusting the temporal transmission line model by setting a characteristic impedance of the medium.

12. The computer program as recited in claim 1, further comprising a code segment for adjusting the temporal transmission line model by correcting for a geometric spreading of a propagating electromagnetic wave.

13. The computer program as recited in claim 1, further comprising a code segment for adjusting the temporal transmission line model by including an ohmic attenuation of a propagating electromagnetic wave.

* * * * *